(12) United States Patent
Mitchell

(10) Patent No.: US 9,621,850 B1
(45) Date of Patent: Apr. 11, 2017

(54) INSTANT ON VIDEO CONFERENCING SYSTEM AND RELATED METHOD

(71) Applicant: Rockwell Collins, Inc., Cedar Rapids, IA (US)

(72) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 54 days.

(21) Appl. No.: 14/645,914

(22) Filed: Mar. 12, 2015

(51) Int. Cl.
*H04N 7/15* (2006.01)
*H04B 7/185* (2006.01)

(52) U.S. Cl.
CPC .......... *H04N 7/15* (2013.01); *H04B 7/18508* (2013.01); *H04B 7/18584* (2013.01)

(58) Field of Classification Search
USPC ...................................................... 348/14.08
See application file for complete search history.

(56) References Cited

U.S. PATENT DOCUMENTS

| 7,324,056 | B2 * | 1/2008 | Wesel | H04B 7/18578 343/702 |
| 2002/0087992 | A1 * | 7/2002 | Bengeult | H04B 7/18508 725/76 |

* cited by examiner

*Primary Examiner* — Amal Zenati
(74) *Attorney, Agent, or Firm* — Angel N. Gerdzhikov; Donna P. Suchy; Daniel M. Barbieri

(57) ABSTRACT

A system and method enable broadband communication between a remote or airborne station and a terrestrial network linking any other station around the earth. The airborne station connectivity may be routed either via a proximal LEO SAT belonging to a high density LEO SAT constellation as well as via a proximal ground based station directly connected with the terrestrial network. Latency values available to the airborne station are within tolerance for video conferencing by employing steerable antenna elements onboard the airborne station to establish connectivity with and actively track one or more proximal LEO SATs. The airborne station maintains connectivity with the ground based station where available via cellular geographical transmission patterns to deconflict specific bands of limited spectrum as well as protocols specific to the local wireless network. The high density LEO SAT constellation is networked and connected to the terrestrial network via several global down links.

27 Claims, 13 Drawing Sheets

INSTANT ON VIDEO CONFERENCING SYSTEM AND RELATED METHOD

CROSS REFERENCE TO RELATED APPLICATIONS

This application is related to U.S. Pat. No. 6,529,706 B1, filed Sep. 13, 1999 entitled "Aircraft Satellite Communications System for Distributing Internet Service from Direct Broadcast Satellites," U.S. Pat. No. 6,741,841 B1 filed Jan. 28, 2000 entitled Dual receiver for a on-board entertainment system," U.S. Pat. No. 8,606,266 B1 filed May 20, 2011 entitled "Airborne communications network routing," U.S. Pat. No. 8,791,853 B2 filed Apr. 20, 2011 entitled "Air-to-Ground Antenna," U.S. Pat. No. 8,831,601 B2 filed Jul. 2, 2012 entitled "Terrestrial communications network suitable for providing air-to-ground connectivity," U.S. patent application Ser. No. 13/398,643 filed Feb. 16, 2012 entitled "Blade Antenna Array," and U.S. patent application Ser. No. 13/775,725 filed Feb. 25, 2013 entitled "Global Broadband Antenna System," each of which is incorporated by reference in its entirety.

FIELD OF THE INVENTIVE CONCEPTS

Embodiments of the inventive concepts disclosed herein relate generally to radio frequency communications between a terrestrial network and a station relatively proximal to or on the earth's surface. More particularly, embodiments of the inventive concepts disclosed herein relate to a system and related method for low latency radio frequency communications available to an airborne station via a high density constellation of low earth orbit satellite vehicles augmented by a ground based communications system.

BACKGROUND

Traditional worldwide radio frequency (RF) broadband communications systems may employ geosynchronous (GEO) satellite vehicles (SAT) to relay communication signals to and from an airborne station. This distant GEO SAT relay is physically limited by line of sight and range. Current GEO SAT orbits are in the range of 23,300 miles above the equator and may inherently possess an approximate 300 millisecond (ms) one way travel time in signal transmission from a point on the surface of the earth, relayed from the GEO SAT, to an airborne station above the surface of the earth.

Current video conferencing systems demand less than 100 ms latency in signal transmission to effectively operate without a noticeable delay for the user. This 100 ms benchmark has proven to be a requirement for most video conferencing applications in use. Practical Internet Protocol (IP) based airborne video conferencing systems may be limited by severe GEO SAT latencies which, depending on range and the ground network design, may reach as much as a second to several seconds of signal travel time making the video conference experience undesirable and difficult. A user attempting to video conference over a high latency GEO SAT system without being trained in the use of such a system may result in one user talking during the time the opposite user is talking.

This 100 ms benchmark is physically beyond current capabilities of GEO SAT relay systems. The cumbersome GEO SAT delay may have proven tolerable in the past. However, with current communications systems employed onboard airborne vehicles and within portable devices, this level of latency may be unacceptable to users. Specifically, transmission time of radio signals within the free space distance of a GEO SAT will always exceed the discernable 100 ms threshold for successful bi-directional audio and video teleconferencing.

In addition, GEO SAT systems require a large antenna element mounted onboard the airborne station (e.g., an aircraft) to physically connect with the distant GEO SAT. The large scale of the GEO SAT communications antenna element physically limits the size of the platform on which the GEO SAT communications system may be installed. In some cases, traditional airborne GEO SAT antenna elements may require a diameter of as much as three to four feet of horizontal space on the upper fuselage of the airborne vehicle to enable the gain to be sufficient. This spatial requirement eliminates smaller aircraft (which may have fuselage diameters as small as 4.5 feet) from consideration for a satellite based communications system. Large antennas designs limit effect the aircraft aerodynamics and reduce the effective range, a highly competitive factor among aircraft manufacturers.

Additionally, while operating above and below approximately 70 degrees of north and south latitude, GEO SAT based communications systems onboard airborne vehicles begin to lose their visibility to the geosynchronous belt due to the physical low look angle of the airborne antenna elements at that latitude. This limitation may eliminate service availability and also be intolerable to specific users routinely flying in the polar areas of the world.

Traditional Low Earth Orbit (LEO) and Medium Earth Orbit (MEO) SAT constellations may operate constrained by spectrum, by SAT population (beam density), by bandwidth, or a combination of all three. These deployed constellations are inherently constrained by bandwidth and spacecraft beam density to enable lower bit rate (LBR) video communication at 100s of kilobits to low megabit channel averages. They are unable to offer the bandwidth and latency necessary for higher definition, multi-user, multi-megabit video conferencing.

Therefore, a need remains for a markedly greater broadband system introducing novel elements onboard the airborne station coupled with a higher density, broadband LEO SAT constellation offering a network architecture configured for real time video conferencing of less than 100 ms in communications available to the airborne station. Further there is a need for the system to operate seamlessly and globally at the lowest cost.

SUMMARY

Accordingly a system for airborne broadband may comprise a first station configured for airborne mobility, surface mobility, and stationary placement, the first station further configured for a broadband radio frequency (RF) satcom connectivity and a broadband RF terrestrial connectivity with a terrestrial network.

The system may include a satcom electronically steerable array (ESA) antenna element onboard the first station configured for the broadband RF satcom connectivity with at least one low earth orbit satellite vehicle (LEO SAT) of a high density LEO SAT constellation, the satcom ESA antenna element limited in size for placement within an aircraft structure, the satcom ESA antenna element further configured for a programmable limited look angle from a zenith relative to the first station, the satcom ESA antenna element further configured for high line of sight tracking of the at least one LEO SAT.

The high line of sight tracking may include establishing and maintaining the broadband RF satcom connectivity with a first LEO SAT of the at least one LEO SAT, determining an imminent loss of the broadband RF satcom connectivity with the first LEO SAT, the imminent loss of broadband RF satcom connectivity based on a received signal power level from the first LEO SAT and a current look angle to the first LEO SAT from the zenith, establishing an initial connectivity with a second LEO SAT of the at least one LEO SAT, and transitioning the broadband RF satcom connectivity from the first LEO SAT to the second LEO SAT.

The system may include a terrestrial antenna element onboard the first station configured for the broadband RF terrestrial connectivity with at least one ground station associated with the terrestrial network, a controller onboard the first station, the controller in data communication with the satcom ESA antenna element and the terrestrial antenna element, the controller configured for determining a desired RF connectivity between the broadband RF satcom connectivity and the broadband RF terrestrial connectivity, the determining based on a user condition, establishing a data connectivity between the first station and the terrestrial network via the desired RF connectivity, and directing a content of the data connectivity to at least one recipient onboard the first station.

An additional embodiment of the inventive concepts disclosed herein may include a system wherein the ground station provides at least one upward directed RF beam, the at least one upward directed RF beam comprising a pattern of cellular geographical transmission areas, each cellular geographical transmission area 1) bounded by an azimuth and an elevation from the at least one ground station, 2) limited to transmission and reception on a frequency band, and 3) frequency deconflicted from an adjacent cellular geographical transmission area, the frequency band two or more frequency bands available to the at least one ground station.

The terrestrial antenna element may be further configured for tracking the at least one ground station, the tracking including establishing the broadband RF terrestrial connectivity with a first ground station via a first cellular geographical transmission area provided by the first ground station, the first cellular geographical transmission area limited to a first frequency band of the two or more frequency bands, maintaining the broadband RF terrestrial connectivity within the first cellular geographical transmission area via the first frequency band, and determining a current azimuth and elevation from the first ground station to the terrestrial antenna element.

The system may determine an imminent loss of the broadband RF terrestrial connectivity within the first cellular geographical transmission area, the imminent loss of the broadband RF terrestrial connectivity based on the current azimuth and elevation, establishing an initial broadband RF terrestrial connectivity with a second cellular geographical transmission area provided by the first ground station and a second ground station, the second cellular geographical transmission area limited to a second frequency band of the two or more frequency bands, and transitioning the broadband RF terrestrial connectivity from the first cellular geographical transmission area to the second cellular geographical transmission area.

An additional embodiment of the inventive concepts disclosed herein may include a system wherein the terrestrial connectivity is established via a Long-Term Evolution (LTE) wireless data communication standard, a standard using a Frequency Division Duplex (FDD) communications and a standard using a Time Division Duplex (TDD) communications.

An additional embodiment of the inventive concepts disclosed herein may include a system wherein the user condition is at least a regulatory connectivity comparison, a cost comparison, a speed comparison, a range comparison and a bandwidth comparison between the broadband RF satcom connectivity and the broadband RF terrestrial connectivity.

An additional embodiment of the inventive concepts disclosed herein may include a system wherein the satcom ESA antenna element further comprises a flat panel Electronically Steered Array (ESA) antenna, a curved panel ESA antenna and a set of independent mechanically tilted ESA antenna elements horizontally rotatable about a vertical axis of the first station.

An additional embodiment of the inventive concepts disclosed herein may include a system wherein each of the satcom ESA antenna element and the terrestrial antenna element are multiple antenna elements disposed within a nose radome of an aircraft, dual antenna elements disposed within the nose radome of the aircraft, and a single antenna element including multiple elements disposed within the nose radome of the aircraft.

An additional embodiment of the inventive concepts disclosed herein may include a system wherein the single antenna element including multiple elements disposed within the nose radome of the aircraft is further configured as a multi-role antenna element configured for 1) the broadband RF satcom connectivity, 2) the broadband RF terrestrial connectivity, and 3) transmission and reception of a weather radar signal.

An additional embodiment of the inventive concepts disclosed herein may include a system further including a latency value associated with each of the broadband RF satcom connectivity and the broadband RF terrestrial connectivity is less than one hundred milliseconds, a range from zero to two-hundred milliseconds, and less than fifty milliseconds.

An additional embodiment of the inventive concepts disclosed herein may include a system wherein the satcom ESA antenna element is limited in size to less than one foot in diameter for placement within the aircraft structure.

An additional embodiment of the inventive concepts disclosed herein may include a system wherein at least the broadband RF terrestrial connectivity and the broadband RF satcom connectivity operates within 1) a frequency range from 5.725 GHz to 5.805 GHz, 2) a frequency range of 12 to 18 GHz inclusive of the Ku band, 3) a frequency range from an unlicensed band, including an unlicensed 2.4 GHz band and an unlicensed 5 GHz band, and 4) a frequency range reallocated from a purpose other than communication.

An additional embodiment of the inventive concepts disclosed herein may include a system wherein at least the satcom ESA antenna element and the terrestrial antenna element is configured for mounting within an unmodified nose radome of an aircraft.

An additional embodiment of the inventive concepts disclosed herein may include a system wherein the controller is further configured for maintaining connectivity with the terrestrial network via at least a cellular base station transfer protocol, a mobile internet protocol, and a combination of the cellular base station transfer and mobile internet protocols.

An additional embodiment of the inventive concepts disclosed herein may include a system further including a software defined radio configured for establishing the broadband RF terrestrial connectivity with the terrestrial network, the software defined radio configured for adapting to a plurality of protocols from each of a plurality of the at least one ground station.

An additional embodiment of the inventive concepts disclosed herein may include a method for airborne broadband, comprising establishing a radio frequency (RF) satcom connectivity between a first station and a terrestrial network, the first station configured for airborne mobility, surface mobility and stationary placement.

The method may include broadband RF satcom connectivity via a satcom ESA antenna element onboard the first station configured for the broadband RF satcom connectivity with at least one low earth orbit satellite vehicle (LEO SAT) of a high density LEO SAT constellation, the satcom ESA antenna element limited in size for placement within an aircraft structure, the satcom ESA antenna element further configured for a programmable limited look angle from a zenith relative to the first station.

The method may further include establishing and maintaining the broadband RF satcom connectivity via a first LEO SAT of the at least one LEO SAT via a high line of sight tracking of the at least one LEO SAT, the high line of sight tracking including determining an imminent loss of the broadband RF satcom connectivity with the first LEO SAT, the imminent loss of broadband RF satcom connectivity based on a received signal power level from the first LEO SAT and a current look angle to the first LEO SAT from the zenith, establishing an initial connectivity with a second LEO SAT of the at least one LEO SAT, and transitioning the broadband RF satcom connectivity from the first LEO SAT to the second LEO SAT.

The method may also include establishing a broadband RF terrestrial connectivity between the first station and the terrestrial network, the broadband RF terrestrial connectivity via a terrestrial antenna element onboard the first station configured for the broadband RF terrestrial connectivity with at least one ground station associated with the terrestrial network hexagonal, determining a desired RF connectivity between the broadband RF satcom connectivity and the broadband RF terrestrial connectivity, the determining based on a user condition, the determining via a controller onboard the first station in data communication with the satcom ESA antenna element and the terrestrial antenna element, establishing a data connectivity between the first station and the terrestrial network via the desired RF connectivity, and directing, via the controller, a content of the data connectivity to at least one recipient onboard the first station.

An additional embodiment of the inventive concepts disclosed herein may include a method wherein the at least one ground station provides at least one upward directed RF beam, the at least one upward directed RF beam comprising a pattern of cellular geographical transmission areas, each cellular geographical transmission area 1) bounded by an azimuth and an elevation from the at least one ground station, 2) limited to transmission and reception on a frequency band and 3) frequency deconflicted from an adjacent cellular geographical transmission area, the frequency band two or more frequency bands available to the at least one ground station.

The terrestrial antenna element may be further configured for tracking the at least one ground station, the tracking including establishing the broadband RF terrestrial connectivity between the first station and a first ground station via a first cellular geographical transmission area provided by the first ground station, the first cellular geographical transmission area limited to a first frequency band of the two or more frequency bands, maintaining the broadband RF terrestrial connectivity within the first cellular geographical transmission area via the first frequency band, determining a current azimuth and elevation from the first ground station to the terrestrial antenna element.

The method may determine an imminent loss of the broadband RF terrestrial connectivity within the first cellular geographical transmission area, the imminent loss of the broadband RF terrestrial connectivity based on the current azimuth and elevation, establishing initial broadband RF terrestrial connectivity with a second cellular geographical transmission area provided by the first ground station, the second cellular geographical transmission area limited to a second frequency band of the two or more frequency bands, and transitioning the broadband RF terrestrial connectivity from the first cellular geographical transmission area to the second cellular geographical transmission area.

An additional embodiment of the inventive concepts disclosed herein may include a method wherein the terrestrial connectivity is established via a Long-Term Evolution wireless data communication standard, a standard using a Frequency Division Duplex communications and a standard using a Time Division Duplex communications.

An additional embodiment of the inventive concepts disclosed herein may include a method wherein the user condition is at least a regulatory connectivity comparison, a cost comparison, a speed comparison, a range comparison and a bandwidth comparison between the broadband RF satcom connectivity and the broadband RF terrestrial connectivity.

An additional embodiment of the inventive concepts disclosed herein may include a method wherein the satcom ESA antenna element further comprises a flat panel Electronically Scanned Array (ESA) antenna, a curved panel ESA antenna and a set of independent mechanically tilted ESA antenna elements horizontally rotatable about a vertical axis of the first station.

An additional embodiment of the inventive concepts disclosed herein may include a method wherein each of the satcom ESA antenna element and the terrestrial antenna element are multiple antenna elements disposed within a nose radome of an aircraft, dual antenna elements disposed within the nose radome of the aircraft, and a single antenna element including multiple elements disposed within the nose radome of the aircraft, and wherein each of the satcom ESA antenna and the terrestrial antenna is configured for mounting within an unmodified nose radome of an aircraft.

An additional embodiment of the inventive concepts disclosed herein may include a method wherein the single antenna element including multiple elements disposed within the nose radome of the aircraft is further configured as a multi-role antenna element configured for 1) the broadband RF satcom connectivity, 2) the broadband RF terrestrial connectivity and 3) transmission and reception of weather radar signals.

An additional embodiment of the inventive concepts disclosed herein may include a method further including a latency value associated with each of the satcom connectivity and the terrestrial connectivity is less than one hundred milliseconds, a range from zero to two-hundred milliseconds and less than fifty milliseconds.

An additional embodiment of the inventive concepts disclosed herein may include a method wherein the satcom ESA antenna element is limited in size to less than one foot in diameter for placement within the aircraft structure.

An additional embodiment of the inventive concepts disclosed herein may include a method wherein at least the terrestrial connectivity and the satcom connectivity operates within 1) a frequency range from 5.725 GHz to 5.805 GHz, 2) a frequency range of 12 to 18 GHz inclusive of the Ku band, 3) a frequency range from an unlicensed band including an unlicensed 2.4 GHz band and an unlicensed 5 GHz band, and 4) a frequency range reallocated from a purpose other than communication, and 5) a frequency band associated with VHF, UHF, L, S, F, C, X, K, Q U, V, E W, F, D, THz and optical bands.

An additional embodiment of the inventive concepts disclosed herein may include a method wherein maintaining the broadband RF terrestrial connectivity further includes the controller maintaining connectivity with the terrestrial network via at least a cellular base station transfer protocol, a mobile internet protocol and a combination of the cellular base station transfer and mobile internet protocols.

An additional embodiment of the inventive concepts disclosed herein may include a method wherein establishing the broadband RF terrestrial connectivity further includes a software defined radio onboard the first station configured for establishing the broadband RF terrestrial connectivity with the terrestrial network, the software defined radio configured for adapting to a plurality of protocols from each of a plurality of terrestrial networks.

An additional embodiment of the inventive concepts disclosed herein may include a system for worldwide broadband, comprising a high density Low Earth Orbit (LEO) Satellite (SAT) constellation comprising a plurality of LEO SAT vehicles configured for a Radio Frequency (RF) satcom connectivity with a first station of a plurality of stations, a satcom electronically steered array (ESA) antenna element onboard the first station configured for the broadband RF satcom connectivity with at least one LEO SAT of the high density LEO SAT constellation.

The system may include a satcom ESA antenna element limited in size for placement within an aircraft structure, the satcom ESA antenna element further configured for a programmable limited look angle from a zenith relative to the first station or relative to the earth horizon of the airborne station, the satcom ESA antenna element further configured for high line of sight tracking of the at least one LEO SAT, the high line of sight tracking including establishing and maintaining the broadband RF satcom connectivity with a first LEO SAT of the at least one LEO SAT, determining an imminent loss of the broadband RF satcom connectivity with the first LEO SAT.

The system may include determining the imminent loss of broadband RF satcom connectivity based on a received signal power level from the first LEO SAT and a current look angle to the first LEO SAT from the zenith, establishing an initial connectivity with a second LEO SAT of the at least one LEO SAT, and transitioning the broadband RF satcom connectivity from the first LEO SAT to the second LEO SAT, a terrestrial network maintaining RF connectivity with the high density LEO SAT constellation.

The system may include at least one ground station associated with the terrestrial network configured for wired connectivity with the terrestrial network and a broadband RF terrestrial connectivity with the first station, the at least one ground station providing at least one upward directed RF beam, the at least one upward directed RF beam comprising a pattern of cellular geographical transmission areas, each cellular geographical transmission area 1) bounded by an azimuth and an elevation from the at least one ground station, 2) limited to transmission and reception on a frequency band and 3) frequency deconflicted from an adjacent cellular geographical transmission area, the frequency band two or more frequency bands available to the at least one ground station.

The system may include a terrestrial antenna element onboard the first station configured for the broadband RF terrestrial connectivity with the at least one ground station, the terrestrial antenna element further configured for tracking the at least one ground station, the tracking including establishing the broadband RF terrestrial connectivity with a first ground station via a first cellular geographical transmission area provided by the first ground station, the first cellular geographical transmission area limited to a first frequency band of the two or more frequency bands, maintaining the broadband RF terrestrial connectivity within the first cellular geographical transmission area via the first frequency band.

The system may determine a current azimuth and elevation from the first ground station to the terrestrial antenna element, determine an imminent loss of the broadband RF terrestrial connectivity within the first cellular geographical transmission area, the imminent loss of the broadband RF terrestrial connectivity based on the current azimuth and elevation, establishing an initial broadband RF terrestrial connectivity with a second cellular geographical transmission area provided by the first ground station and a second ground station, the second cellular geographical transmission area limited to a second frequency band of the two or more frequency bands, transitioning the broadband RF terrestrial connectivity from the first cellular geographical transmission area to the second cellular geographical transmission area.

The system may further include a controller onboard the first station, the controller in data communication with the satcom ESA antenna element and the terrestrial antenna element, the controller configured for determining a desired RF connectivity between the broadband RF satcom connectivity and the broadband RF terrestrial connectivity, the determining based on a user condition, establishing a data connectivity between the first station and the terrestrial network via the desired RF connectivity, and directing a content of the data connectivity to at least one recipient onboard the first station.

An additional embodiment of the inventive concepts disclosed herein may include a system wherein each of the at least one ground station and the plurality of LEO SAT vehicles are configured with antenna elements for producing the pattern of cellular geographical transmission areas trackable by each of the satcom ESA antenna element and the terrestrial antenna element.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Figure 1:
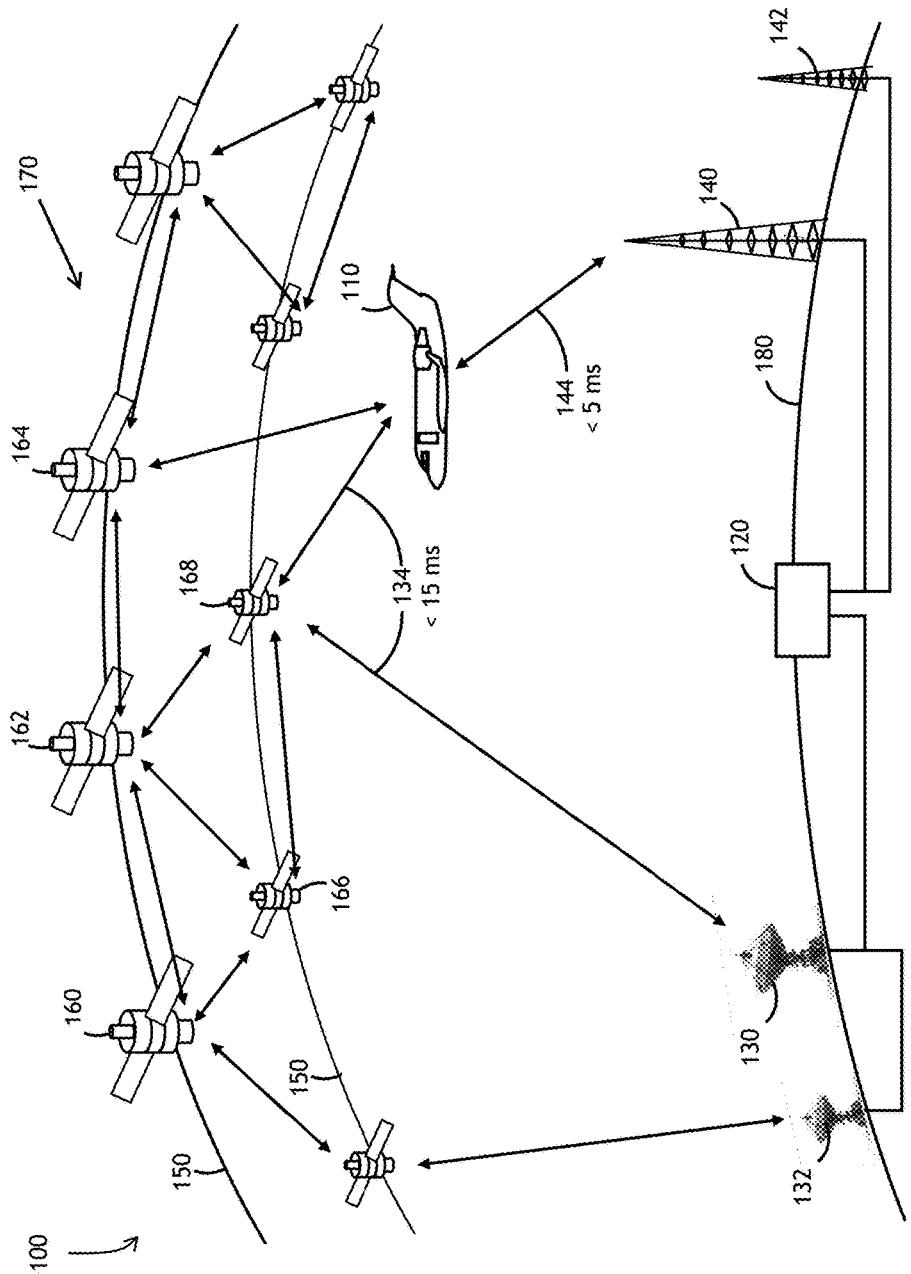
FIG. 1 is a diagram of an exemplary system for broadband communication with an airborne station in accordance with an embodiment of the inventive concepts disclosed herein.

Reference will now be made in detail to the presently preferred embodiments of the inventive concepts disclosed herein, examples of which are illustrated in the accompanying drawings. The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

| Reference Chart | |
|---|---|
| Ref. No. | Description |
| 100 | System including LEO SAT, Terrestrial Network, Airborne System |
| 110 | Airborne Station |
| 120 | Terrestrial Network |
| 130 | Satcom Ground Antenna |
| 132 | Satcom Ground Antenna n |
| 134 | Satcom Link |
| 140 | Ground Antenna |
| 142 | Ground Antenna (LTE) |
| 144 | Terrestrial Link |
| 150 | Low Earth Orbit |
| 160 | First LEO SAT Vehicle |
| 162 | Second LEO SAT Vehicle |
| 164 | Third LEO SAT Vehicle |
| 166 | Fourth LEO SAT Vehicle |
| 168 | nth LEO SAT Vehicle |
| 170 | LEO SAT Constellation |

| Reference Chart | |
|---|---|
| Ref. No. | Description |
| 180 | Surface of the Earth |
| 200 | LEO SAT Distribution |
| 268 | LEO SAT High Density Cell Pattern |
| 300 | Airborne System |
| 310 | Wireless Router |
| 312 | Onboard Wireless Antenna |
| 314 | First Portable Electronic Device (PED) |
| 316 | Second PED |
| 330 | Satcom Air to Ground Router |
| 332 | Satcom Terminal |
| 334 | Satcom ESA antenna |
| 338 | Satcom Controller |
| 342 | Air to Ground Terminal |
| 344 | Terrestrial Antenna |
| 348 | Terrestrial Controller |
| 410 | Unmanned Aerial Vehicle |
| 420 | Routing Protocol |
| 422 | Digital Switch |
| 424 | Internet |
| 426 | Ground PED |
| 430 | Satcom Service Provider |
| 432 | Network Operations Center |
| 440 | Terrestrial Service Provider |
| 442 | Base Station |
| 500 | Look Angle Geometry |
| 510 | Aircraft Zenith |
| 530 | Aircraft Look Angle |
| 534 | Hybrid Satcom Antenna Element |
| 600 | Surface capability |
| 610 | Satcom Phone |
| 634 | Satcom Phone Antenna |
| 700 | Ground Antenna transmission and reception pattern |
| 710 | Second airborne station |
| 720 | Cellular Pattern |
| 722 | First cellular geographical transmission area |
| 724 | Second cellular geographical transmission area |
| 726 | Third cellular geographical transmission area |
| 728 | Fourth cellular geographical transmission area |
| 910 | Nose Radome |
| 930 | Transparent Patch |
| 934 | Single Antenna Element |
| 954 | Weather radar signals |
| 1034 | Satcom Antenna Coverage |
| 1044 | Terrestrial antenna Coverage |
| 1200 | Flowchart |
| 1202 | Start |
| 1204 | Sample a LEO SAT |
| 1206 | Look Angle Tolerance Check |
| 1208 | Sample a Forward Cellular Transmission Area |
| 1210 | Compare cost, speed and strength |
| 1212 | Select Desired Connectivity |
| 1214 | Route Signals via Desired Connectivity |
| 1216 | Bandwidth Monitor |
| 1218 | Cost monitor |
| 1220 | LEO SAT Look angle monitor |
| 1222 | Regulatory Restricted area monitor |
| 1224 | Select new LEO SAT with desirable look angle |
| 1226 | Terrestrial connectivity Signal within Tolerance |
| 1228 | Cellular Transmission Area Boundary |
| 1234 | Establish satcom connectivity |
| 1244 | Establish terrestrial connectivity |
| 1250 | Desired Connectivity Monitor |

Referring to FIG. 1, a diagram of an exemplary system for broadband communication with an airborne station in accordance with an embodiment of the inventive concepts disclosed herein is shown. The system 100 may include an airborne station 110, a high density LEO SAT constellation 170 coupled with a terrestrial network 120 via a satcom link 134, and a plurality of ground antennas 140 and LTE tower 142 configured to link the terrestrial network 120 directly with the airborne station 110 via a terrestrial link 144. Since the time required for a signal to travel from the airborne station 110 to the terrestrial network may be relatively fast (e.g., 15 ms), and faster yet via the terrestrial link (e.g., 5 ms), the system 100 may offer users onboard the airborne station 110 a successful video conferencing session with users anywhere in the world.

In one embodiment, the system 100 may supply a user or system onboard airborne station 110 with the broadband connectivity for low latency video teleconferencing, in-flight entertainment, supply aircraft avionics information, and low latency control of the control surfaces of an aircraft.

Embodiments of the inventive concepts disclosed herein are directed to a system and related method for broadband communication between an airborne station 110 and a terrestrial network 120 for further wired and wireless communication with any other station around the earth. Communications from the airborne station 110 may be routed either via a satcom link 134 or via a terrestrial link 144 (or both satcom link 134 and terrestrial link 144 simultaneously). In the case of the satcom link 134, a high density LEO SAT constellation 170 may provide the coverage necessary for the airborne station 110 to communicate via one or more of the LEO SATs 160 within the high density LEO SAT constellation 170. The high density LEO SAT constellation 170 may maintain continuous connectivity with the terrestrial network 120 via a plurality of satcom ground antennas 130 and 132. In the case of communications via the terrestrial link 144, a plurality of ground antennas 140 and LTE tower 142 are networked providing the terrestrial link 144 connectivity with the terrestrial network 120 via a ground antenna 140 proximal with the airborne station 110.

As used herein, a LEO SAT 160 may be defined as a satellite vehicle in an orbit around the earth that is not a geostationary orbit. A geostationary orbit (e.g. geosynchronous equatorial orbit) is traditionally defined as an orbit allowing the GEO SAT to remain in a fixed position relative to a point on the surface of the earth. The LEO SAT vehicles referenced throughout this disclosure may be in a low earth orbit (LEO) 150 which includes relative motion with reference to a point on the surface of the earth.

Since the high density LEO SAT constellation 170 is relatively close to the airborne station 110 and to the surface 180 of the earth, a latency value available to the airborne station 110 via the satcom link 134 is well within the tolerance for successful video conferencing. For example, a latency value associated with each of the satcom link 134 may be less than one hundred milliseconds enabling a user onboard the airborne station 110 the ability to effectively video conference with another user anywhere in the world. In addition, some embodiments of the system 100 may enable a latency value of a range from zero to two-hundred milliseconds. In other embodiments, the system 100 latency may be less than fifty milliseconds. When the terrestrial link 144 is available, a latency value associated with the terrestrial link 144 may, due to the close range between the airborne station and the ground antennas, be less than 50 milliseconds.

The system 100 may employ a steerable antenna onboard the airborne station 110 to establish the satcom link 134 with the high density broadband LEO SAT constellation 170. Within LEO SAT constellation 170, several global down links connecting the LEO SAT constellation 170 to the terrestrial network 120 via the satcom ground antenna 132 may provide connectivity between the LEO SAT constellation 170 and the terrestrial network 120.

Should the system 100 direct the airborne station 110 to connect to the terrestrial network 120 via the ground antennas 140 and LTE tower 142, each ground antenna 140 and LTE tower 142 may offer a cellular geographic transmission area available to the airborne station 110 for near immediate (<5 ms) connectivity. A separate terrestrial antenna element onboard the airborne station 110 may enable the airborne station 110 to communicate with the terrestrial network 120 via one of the ground antennas 140 and LTE tower 142.

This configuration may enable practical voice/video conversations allowing a user onboard the airborne station 110 to maintain a successful video conference without the talk-over problem found in traditional systems. In addition, a pre-established connected and secure IP system link and video application session between users may enable call acquisition latency to be near zero time.

In one embodiment, a single enabling action may be used to enable a conferencing channel from a maintenance standby mode. For example, upon initialization of an aircraft's central system network, the system onboard airborne station 110 may open or request real-time maintenance data sessions between all potential conferencing members on a preferred contact list. The system onboard the airborne station 110 may accomplish this by use of a maintained table of IP router port addresses and security authorization codes for enabling a two-way session or tunnel through network routers to a local system associated with ground based contacts. Video and audio data exchanges (presentations) between the aircraft system users and the list of off-board members are held-off or disabled to voice and video codecs until a time where a member requests (signals another) and grants the instant ability to switch from a link maintenance data stream to enabling the voice and video codec stream. This pre-staged communications setup may be faster than waiting for an IP application to launch or dialing a phone number. This system also solves the problem of how a preferred group of ground users may discover and contact the aircraft users on an IP network.

Embodiments of the inventive concepts disclosed herein may include a high-density LEO SAT constellation 170 for delivering the low-latency required (<100 ms) for broadband IP data to the airborne station 110. By deploying high density, high-power, low-earth orbit (LEO) class satellites 160, a simultaneous breakthrough in both link margin and latency values may enable voice/video teleconferencing performance that may meet current video application requirements.

Specifically, embodiments of the inventive concepts disclosed herein may detail a LEO SAT constellation 170 having a high population density (greater than 100 global satellite vehicles) each LEO SAT 160, 162, 164, 166, 168 having: 1) a high spot beam density; 2) a high Effective Isotropically Radiated Power (EIRP) (e.g., >80 dBW, with antenna gain-to-noise-temperature (G/T) exceeding 30 dB/K); and 3) an available frequency spectrum offering a broadband capability (as much as 1 GHz of reusable spectrum per LEO SAT).

Each of the LEO SAT 160 may remain within a LEO 150 relatively proximal to the surface 180 of the earth to enable the desired latency of the system 100. For example, a LEO 150 of approximately 185 nautical miles may be one desirable LEO 150 for the high density LEO SAT constellation 170.

The LEO SAT constellation 170 may provide a global, continuous-coverage broadband link supporting instant IP sessions and enabling low-latency video teleconferencing ability (e.g. such as "Face Time" ™) from a personal electronic device by a user onboard the airborne station 110.

The system 100 may enable low-latency broadband IP for other applications as well. The system 100 may optionally include the terrestrial link 144 for augmentation of the satcom link 134. An air to ground radio onboard airborne station 110 may include a system of radios as well as a software radio capable of sending and receiving signals in compliance with one or more air-to-ground standard (e.g., Europe, U.S., China). The system 100 may provide an aeronautical broadband system having unique continuous global coverage, with broadband capability, low-latency and low cost of ownership.

Cost may drive the system 100 to a transition between the satcom link 134 and the terrestrial link 144. For example, should the terrestrial link 144 cost a tenth of the cost of the satcom link 134, an operator may configure the system 100 with a user preference for the terrestrial link 144 over the satcom link 134. This preference may include a software configuration onboard the airborne station 110 as well as an updated preference sent from a ground based administrator to systems onboard the airborne station 110.

Figure 2:
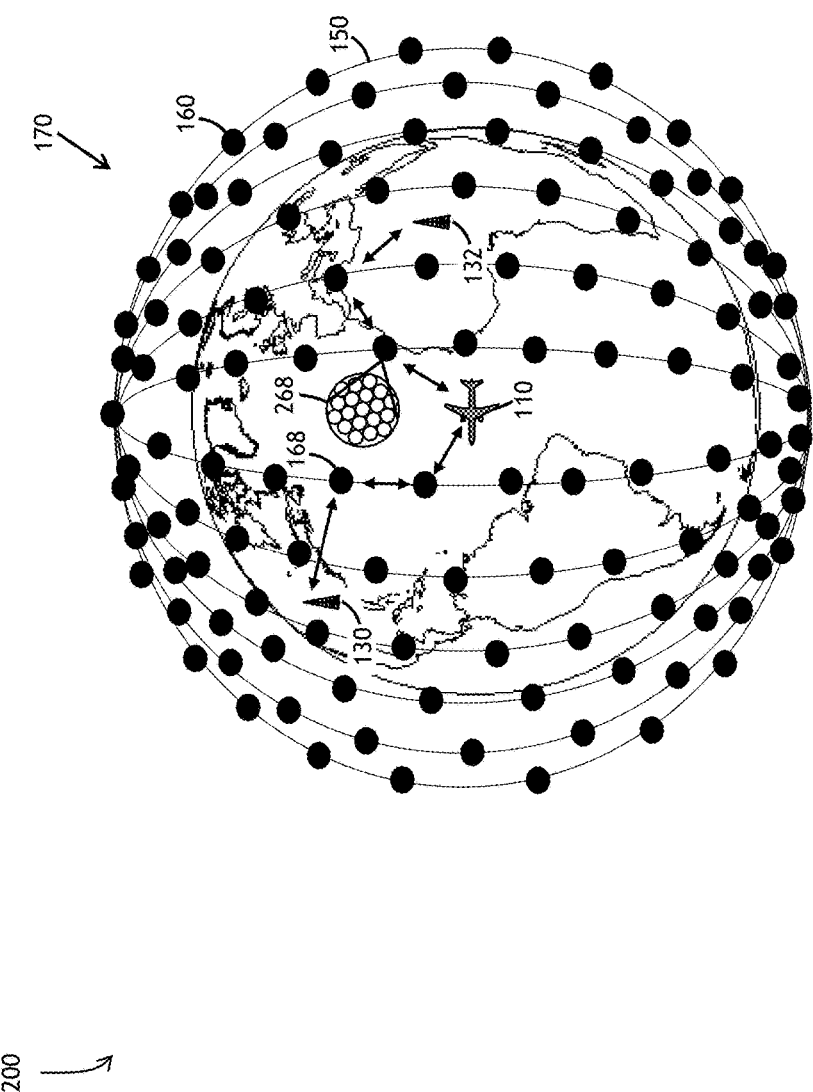
FIG. 2 is a diagram of an exemplary LEO SAT constellation in accordance with an embodiment of the inventive concepts disclosed herein.

Referring to FIG. 2, a diagram of an exemplary LEO SAT constellation in accordance with an embodiment of the inventive concepts disclosed herein is shown. LEO SAT distribution 200 may indicate the population of LEO SAT 160 usable by the system 100 for worldwide coverage. Each LEO SAT 160 of the constellation 170 may possess on-board processing to send and receive signals to and from other LEO SATs 162 as well as the satcom ground antennas 130. Further, each of the LEO SAT 160 may transmit signals downward to enable the satcom link 134 with the satcom antenna 130 via a high density cell pattern 268. Described in more detail below, the high density cell pattern 268 may enable multiple airborne stations connectivity via a limited reusable spectrum available to the LEO SAT 160. Each of the cells within the high density cell pattern may support a broadband satcom link 134 (supporting 10s-100s of Megabits per second per beam) with the airborne station. In addition, small efficient LEO SATs including "micro-satellites" may be particularly suitable for employment by the system 100 for the LEO SAT constellation 170. As used herein a micro satellite may include a LEO SAT that is much smaller in size and weight than GEO or traditional LEO SATs.

The high density LEO SAT constellation 170 may reach LEO SAT number in the hundreds (e.g. 500 or greater). Therefore, the coverage available to each airborne station 110 may be worldwide, and the look angle required of antenna elements onboard the airborne station 110 may allow continuous worldwide coverage. U.S. Pat. No. 6,529,706 to Mitchell "the '706 patent" describes a similar situation of airborne stations in communication with satellite vehicles. The '706 patent teaches an aircraft satellite communications system for distributing Internet service from direct broadcast satellites (DBS) is disclosed. The system is capable of simultaneously including DBS television programming and other data services as well. One or more aircraft may simultaneously use the aircraft satellite communications system.

Each of the aircraft includes a direct broadcast satellite receiver system, an aircraft computer network, and radio equipment for a back-channel (air to ground) communications system. The aircraft satellite communications system may include one or more direct broadcast satellites. Each of the direct broadcast satellites receive uplinked direct broadcast satellite television programming, Internet service, and other data services on the same satellite and transmit satellite television programming, Internet service, and other data services to the direct broadcast satellite receiver system in the aircraft.

The '706 patent continues with disclosure of a direct broadcast satellite ground station transmits uplink direct broadcast satellite television programming, Internet service, and other data services to the satellites. The direct broadcast satellite ground station further comprises a direct broadcast satellite television program source, an Internet interface, and other data services interface. A back-channel ground station for communicating with the aircraft and for receiving data communications from the aircraft over the back-channel may be included.

Each LEO SAT 160 within the LEO SAT constellation 170 may be specified to have several high-density spot beams each using one or more of the S, C, X, Ku, Ka, Q U, V, E, W, D and E bands, optical bands or higher including light wave lasers. In addition, the system 100 may not be limited by or designed around a specific frequency or frequency band. Embodiments of the inventive concepts disclosed herein may operate on a plurality of frequencies on a plurality of bands.

Figure 3:
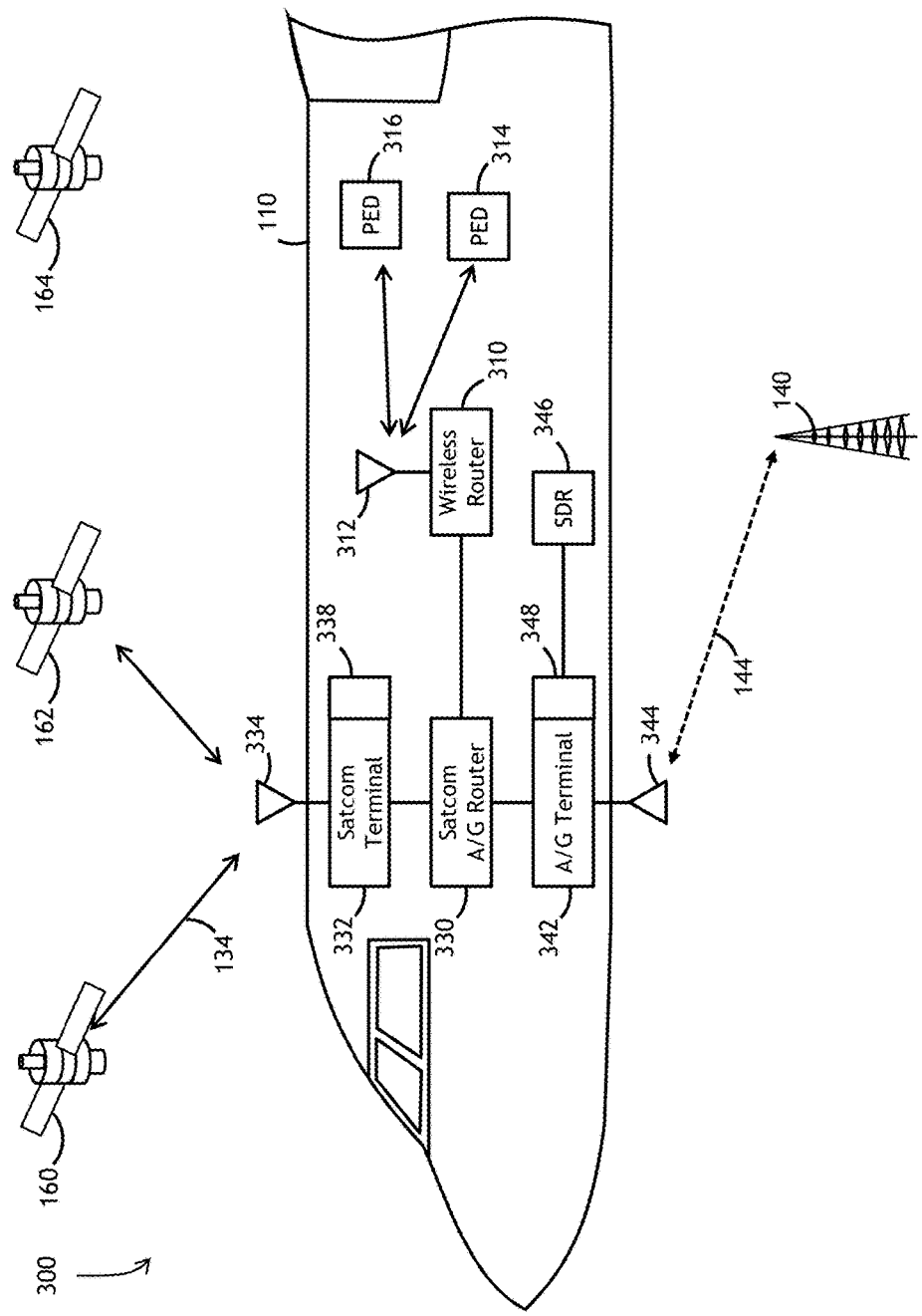
FIG. 3 is a diagram of an airborne station antenna configuration exemplary of one embodiment of the inventive concepts disclosed herein.

Referring to FIG. 3, a diagram of an airborne station antenna configuration exemplary of one embodiment of the inventive concepts disclosed herein is shown. An airborne system 300 onboard the airborne station 110 may provide broadband communication signals to the airborne station 110 via the satcom link 134 via a satcom antenna 334 and the terrestrial link 144 via a terrestrial antenna 344.

A satcom air to ground router 330 may operate to enable the airborne system 300 to determine which of the links (the satcom link 134 or the terrestrial link 144) may be desirable with which to connect for the most favorable connectivity. A satcom terminal 332 and an air to ground terminal 342 may be configured to enable the wireless connection with their respective link. Associated with each of the terminals, a satcom controller 338 may control function of the satcom terminal 332 while a terrestrial controller 348 may control the air to ground terminal 342. Each controller may include a programmable memory and processor for carrying out the variety of function associated with each terminal. In additional embodiments, either or both of the terrestrial controller and the satcom controller 338 may be programmable to exclude transmission to prescribed geospatial areas set by a regulatory authority and to select from one or more prescribed geospatial areas as being available.

Included with the air to ground terminal 342, a software defined radio (SDR) 346 may enable connectivity to a plurality of distinct protocols of worldwide ground based networks discussed above. A wireless router 310 may operate as an RF transceiver onboard the airborne station 110 providing a data connectivity via an onboard wireless antenna 312 to which one or more personal electronic devices (PED) 314 and 316 may connect.

In embodiments, system 300 may establish the terrestrial link 144 via any cell based terrestrial system. For example, use of any air-to-ground bands, use of licensed cellular bands, use of a LTE network, use of a commercially available terrestrial Ku band or use of unlicensed or unlicensed WiFi or UNII bands. The system 300 may employ one of a spectrum in the VHF, UHF, (L band 1-2 GHz), S (2-4 GHz), C (4-8 GHz), X (8-12 GHz), Ku (12-18 GHz), K 18-26.5 GHz, or Ka (26.5-40 GHz) or Q U, V, E, F, D bands to enable either or both of the satcom link 134 and the terrestrial link 144.

The satcom antenna 334 may provide the airborne system 300 the connectivity with one or more of the plurality of LEO SATs 160 within LEO SAT distribution 200. The satcom antenna 334 may be a steerable antenna element capable of directing an antenna beam toward one or more of the LEO SATs 160 and 162. In some embodiments, the satcom antenna 334 and the terrestrial antenna 344 are one or more an Electrically Scanned Antenna (ESA) elements in a configuration for aerodynamic installation onboard the airborne station 110.

The satcom antenna 334 may further specify a small form factor antenna element (e.g., 8-12 inches diameter maximum) configured to communicate with the high density LEO SAT constellation 170. The small satcom antenna 334 may successfully send and receive signals from the LEO SAT vehicles 160 due to: 1) the proximity of each LEO SAT to the airborne station 110; 2) the high LEO SAT EIRP; and 3) a minimum look angle requirement for the satcom antenna 334 beam relative to the airborne station body.

The satcom antenna 334 may include a pointing unit that drives a beam direction. The pointing units compute a beam direction based on the location of the airborne station (e.g. attitude data readings taken from an ARINC 429 avionics bus and a GPS receiver) and a satellite location to direct the transmit and receive antenna beams. The pointing units may be physically located within the controller 338 or optionally may be part of the outboard antenna assembly.

In some embodiments, the terrestrial antenna 344 may function similarly to the antenna described in U.S. Pat. No. 8,791,853 hereinafter "the 853 patent." In the '853 patent, a directional antenna may be installed in an aircraft and may provide air-to-ground communications with ground stations/towers of a cellular network. The antenna is configured for defining enough directionality to reduce the field of view of ground cellular stations while simultaneously enabling communication with ultra-low signal levels from each downward directed antenna. The air-to-ground communication system may be installed on an available surface around an airborne weather radar.

In the '853 patent, the air-to-ground communication system may further include an planar antenna array stack (antenna stack) positioned on the surface around the airborne weather radar, the antenna stack having a plurality of antenna elements, the plurality of antenna elements of the antenna stack being oriented in the same orientation. The air-to-ground communication system may also include a controller communicatively connected with the antenna stack, the controller being configured for controlling a phase angle and gain of at least one of the plurality of antenna elements of the antenna stack, allowing the antenna stack to concentrate radiations in a direction.

Figure 4:
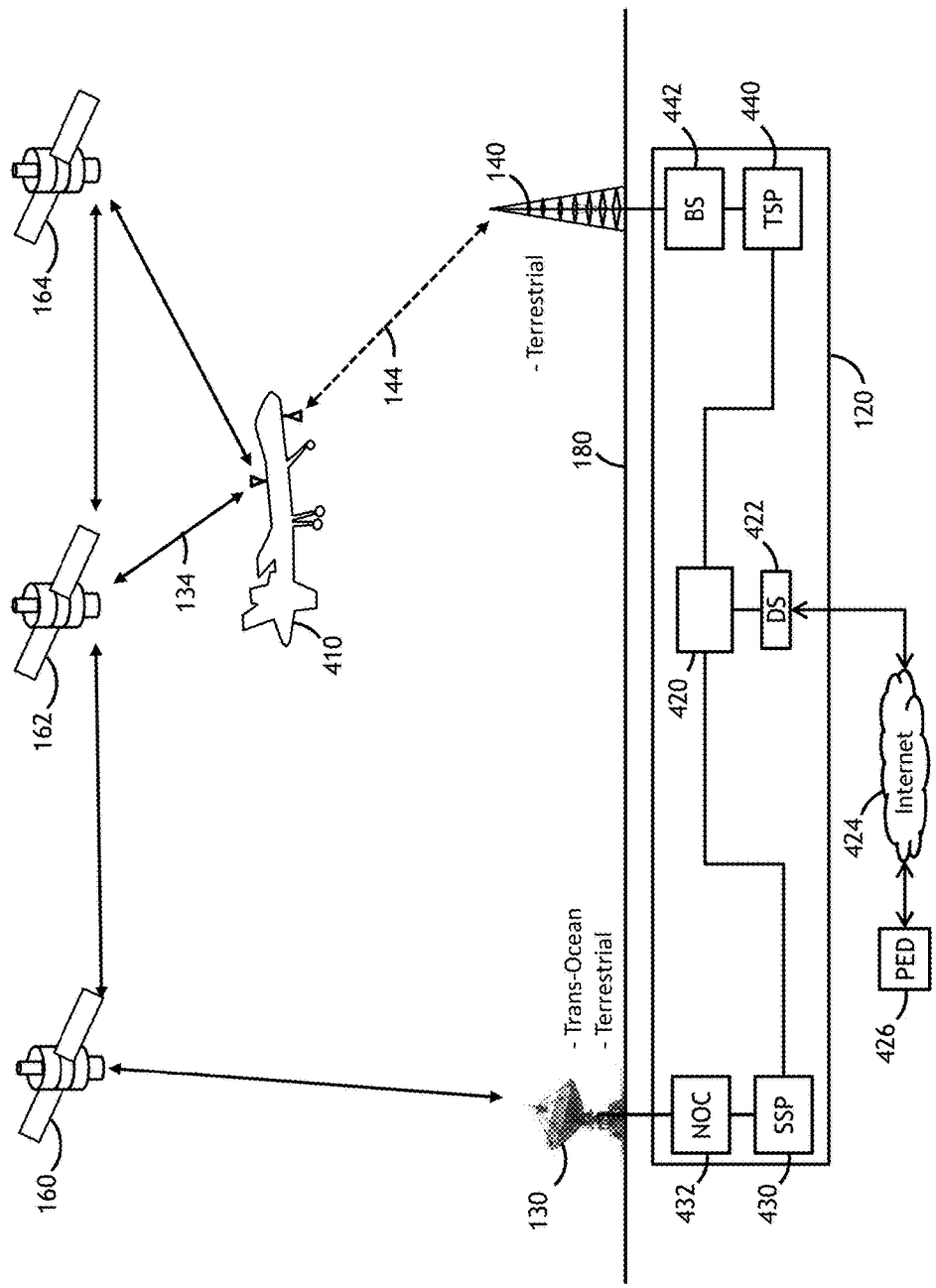
FIG. 4 is an diagram of a terrestrial network exemplary of one embodiment of the inventive concepts disclosed herein.

Referring to FIG. 4, a diagram of a terrestrial network exemplary of one embodiment of the inventive concepts disclosed herein is shown. The terrestrial network 120 may provide the system 100 with the infrastructure necessary to route signals from point to point on the surface 180 of the earth.

At the surface 180 of the earth, the terrestrial network 120 may operate to link the surface based components for successful connectivity between the airborne system 300 and additional stations such as a surface based PED 426. Surface components may include a network operations center 432 connected with and controlling the satcom ground antenna 130. A satcom service provider 430 may operate to link the satcom link 134 with a routing protocol 420. Additionally a terrestrial base station 442 may connect and control the ground antenna 140 as well as connect to a terrestrial service provider 440. A digital switch 422 may operate to route signals to and from an internet 424 either via the satcom link 134 or the terrestrial link 144 or both.

In one embodiment of the inventive concepts disclosed herein, the airborne system 300 may be specifically configured to be carried onboard an Unmanned Aerial Vehicle (UAV) 410. Specifically, the UAV 410 may require continuous reception of a control signal transmitted from a remote location via a low latency network. As latency may increase, control of the UAV 410 may diminish. The present high density LEO SAT constellation 170 network may be suitable for transmission of the control signal from a remote location to the UAV 410.

Further, a feedback signal transmitted from the UAV 410 to the remote location may provide an operator of the UAV 410 feedback including systems status, aircraft status and imagery provided by one or more sensors onboard the UAV 410. The system 100 may provide the high density LEO SAT constellation 170 and broadband signals required for the UAV 410 to transmit and the remote location to successfully receive feedback signals.

Additionally, having both the satcom link 134 and the terrestrial link 144 as a backup available to the UAV 410 may increase a reliability of communications both to and from the UAV 410. For example, should one of the communications links 134 or 144 fail or be jammed by a hostile force, the other communications link 134 or 144 may provide the avenue for transmission of control and feedback signals to and from the UAV 410.

In addition, each of the satcom link 134 and the terrestrial link 144 may provide the same signal to the UAV 410 and the controller associated with the system 300 onboard the UAV 410 may operate to compare the received signals for an appropriate signal to follow. For example, should one of the links be jammed or spoofed by an adversary, the other link may provide an accurate signal the UAV 410 may follow. In addition, a secure signal may be appropriate for sensitive signals destined for the UAV 410 where if one of the links includes unsecure signals, the system 300 controller may deduce that unsecure link is compromised and only follow commands sent via the other link.

Further, a high definition video signal captured by a sensor onboard the UAV 410 may be a similar signal as the video conferencing signals described herein. As the UAV sensor may capture a video image, the satcom link 134 and terrestrial link 144 may operate to affect transfer of the video signal to a remote operator or battle commander.

U.S. Pat. No. 8,606,266 to Mitchell (the '266 patent) teaches a data transmission system for transmitting and receiving data. The data transmission system includes a first communication system configured to transmit and receive data over a first, network and a second communication system configured to transmit and receive data over a second network. The second network, which may be inherently less economical, has a more contiguous physical coverage benefit than the first network. The system further includes a proxy unit configured to select a routing of user data from a user device through either the first communication system or the second communication system.

The '266 patent further teaches the proxy unit is configured to select the routing based on a user condition. This user condition provides a context in which the communication is taking place and may be based on a user preference, a detection of a type of user session (e.g., an SSL session), and/or a travel path of the user as provided by the aircraft flight system of from the crew or passenger. A communication system is selected that provides the best network coverage, including continuity, based on the user condition. In some situations, this selection may override any cost benefit. As one example, detection of an SSL session may cause the proxy unit to select the communication system with the more contiguous physical coverage.

The airborne system 300 may be further configured to provide one or more routing protocols 420 to enable a user onboard the airborne station 110 a continuous level of connectivity with the terrestrial network 120. Such a routing protocol 420 may enable airborne system 300 to transfer from one LEO SAT 160 to another 162 and from the satcom link 134 to the terrestrial link 144 and back while maintaining a continuous low-latency IP session. In one embodiment, the airborne system 300 may employ a protocol similar to that described in the '266 patent as well as a protocol used by cellular providers to pass a mobile station from one base station to the next. In another embodiment, the airborne system 300 may employ a mobile IP packet routing scheme for transfer from the satcom link 134 to the terrestrial link 144 or to another LEO SAT 160 within the satcom link 134 all while the system 300 maintains a continuous IP address. Each of these transfer protocols may maintain a common goal of continuous low latency connectivity between the airborne station 110 and the terrestrial network 120.

Also each of the routing protocols 420 may work alone or in combination with another to affect continuous connectivity. For example, the airborne system 300 may connect via the satcom link 134 using a mobile IP protocol while in the next connection the airborne system 300 may connect via the terrestrial link via a cellular base station routing transfer.

In one embodiment, the user condition may be set based on a regulatory authority in an area in which airborne station is operating. For example, a governmental body may prescribe specific geographic areas where zero terrestrial connectivity is legal. In this area, system 300 may simply engage the satcom link 134 to enable system 300 connectivity with the terrestrial network.

In additional embodiments, the airborne system 300 may employ the software defined radio 346 onboard the airborne station 110 to enable the airborne system 300 connectivity to a plurality of terrestrial networks 120 using the protocol defined by the terrestrial network 120. For example, should UAV 410 fly over a country where a Global System for Mobile Communications (GSM) protocol is in use, the SDR 346 may operatively enable the airborne system 300 connectivity with the GSM terrestrial network 120 via the terrestrial link 144. Additional protocols may be defined for SDR 346 to connect to terrestrial networks such as Code Division Multiple Access (CDMA) as well as additional protocols. In additional embodiments, the terrestrial link 144 may operate in accordance with a standard for wireless data connectivity such as Long-Term Evolution (LTE), a standard using a Frequency Division Duplex (FDD) communications and a standard using a Time Division Duplex (TDD) communications.

In embodiments, the SDR 346 may receive an input from a positioning system onboard the UAV 410 and reference a table of protocols useful within the geographic area over which UAV 410 is flying. In addition, the SDR 346 may sense the frequencies and protocols being used below UAV 410 and properly self-configure the airborne system 300 for low latency connectivity with the terrestrial network 120.

Figure 5:
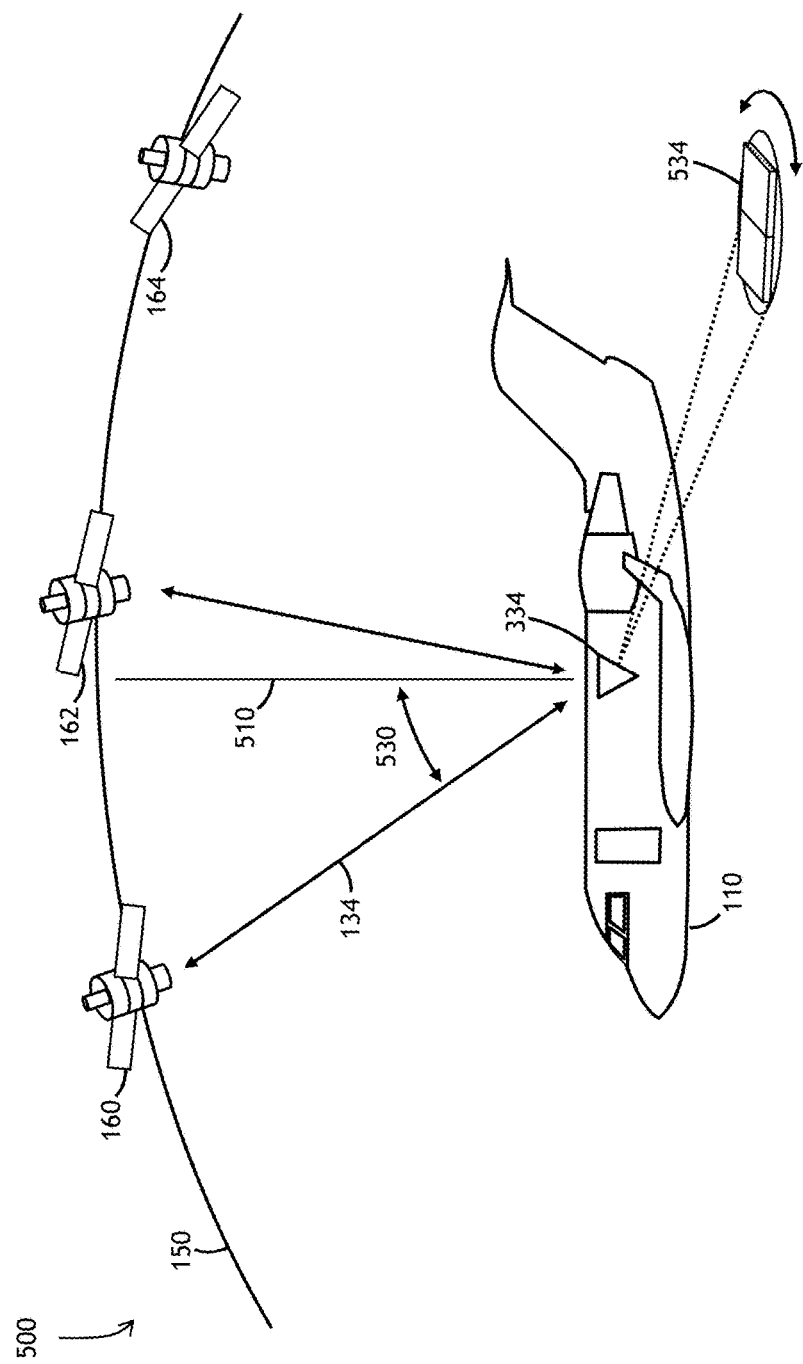
FIG. 5 is a diagram of a look angle available to an airborne station in accordance with one embodiment of the inventive concepts disclosed herein.

Referring to FIG. 5, a diagram of a look angle available to an airborne station in accordance with one embodiment of the inventive concepts disclosed herein is shown. A look angle geometry 500 associated with system 300 satcom link 134 may be an additional factor in enabling the small form factor satcom antenna 334. In embodiments, the system 100 may provide a number of satellite vehicles in the LEO SAT constellation 170 to allow airborne system 300 to limit the look angle 530 required by the satcom antenna 334 to look relative to its zenith 510. In embodiments, the zenith 510 may be measured relative to a vertical from the airborne station 110 as well as relative to an earth horizon from the airborne station 110. In some embodiments, as the system 100 deploys more LEO SATs with each LEO SAT providing high EIRP, the airborne system 300 may realize smaller satcom antenna 334 size.

In embodiments, the system 300 may enable the satcom link 134 in areas of restricted RF terrestrial connectivity. Such limits on RF connectivity may be within a restricted RF zone as well as within an area of no available terrestrial connectivity.

For example, should LEO SAT distribution 200 provide a LEO SAT every 50 nautical miles for a total of approximately 573 LEO SATs in one orbit. This 50 mile range may allow for a small satcom antenna 334 (e.g., less than 12 inches) to be aerodynamically placed within the tail of an aircraft or UAV 410. This small form factor of the airborne system 300 satcom antenna 334 may enable placement without structural modification of the aircraft. This may prove beneficial for a retrofit of an existing aircraft or a UAV 410 with satcom antennas 334 disclosed herein.

Also, a distribution 200 of the LEO SAT constellation 170 may be one factor in determining the small size of the satcom antenna 334 (e.g., more satellites in orbit=less look angle=smaller aircraft antenna). The small satcom antenna 334 may fit many smaller business jet fuselages unlike larger traditional GEO SAT antenna elements.

In embodiments, a controller within satcom terminal 332 onboard the airborne station 110 may operate to alter and limit the look angle 530 available to the satcom antenna 334. Based on the population of the LEO SAT constellation 170, the controller may be programmed to vary and limit the look angle to accommodate a greater or lesser look angle 530 available. For example, a greater population of satellite vehicles within LEO SAT constellation 170 may allow for a lesser maximum look angle 530 available to the satcom antenna 334.

In some embodiments, a size of the satcom antenna 334 may lead to unique placement on a variety of aircraft. In one implementation, satcom antenna 334 may be configured for placement on a horizontal surface of the aircraft fuselage. Some aircraft fuselages may be 4.5 feet in diameter lending to the satcom antenna 334 placement at a 12 o'clock position forward of an aircraft tail. In additional embodiments, the satcom antenna 334 may be specifically configured for placement within the tail of a particular airframe.

In further embodiments of the inventive concepts disclosed herein, the satcom antenna 334 may be placed on the upper fuselage and within a radome at the top of a vertical tail.

In some embodiments, the satcom antenna 334 may be implemented similarly to the antenna described in U.S. patent application Ser. No. 13/775,725 (the '725 application). The '725 application discloses an antenna system for connectivity between a vehicle and a satellite vehicle. The '725 application teaches an antenna configured to send and receive signals from one or more non-geostationary satellites. Additionally, the antenna system includes a directional antenna configured to receive signals from one or more GEO SATs. Furthermore, the one antenna and the directional antenna are configured to be communicatively coupled to a computing device on-board the vehicle.

The '725 application further teaches an antenna system including a multi-band directional antenna configured to receive signals from one or more first-band geostationary satellites over a first band and to receive signals from one or more second-band geostationary satellites over a second band.

The '725 application further teaches a curved electronically scanned array panel including a plurality of amplifier elements distributed over an area of the curved electronically scanned array panel. The curved electronically scanned array panel is configured to receive signals from one or more geostationary satellites. One or more curvatures of an underside of the curved electronically scanned array panel correspond to one or more curvatures of a portion of a surface of a vehicle.

A unique minimum LEO SAT orbit density 200 may be specified based on the maximum "one foot" diameter satcom antenna 334 size and available bandwidth from the LEO SAT 160. The satcom antenna 334 size goal may be realized through a LEO SAT minimum gain (dB), G/T (Gain/Temperature), beamwidth (degrees) and an Inter-satellite Interference specification for broadband performance. The small diameter satcom antenna 334 (e.g., >1 foot) may fit internal structures within most existing small business jets and UAVs 410.

In one embodiment, a hybrid satcom antenna element 534 may include two or more flat panel ESA elements configured at least one as a transmission element and at least one as a reception element. Such a hybrid satcom antenna element may be optimally sited forward of the tail of the airborne station 110. The hybrid antenna elements 534 may include electronically steerable ESA elements configured for switching beam direction in microseconds. This supports an instantaneous switch between a first LEO SAT and a second LEO SAT.

In additional embodiments, the hybrid satcom antenna 534 may include multiple antenna elements. In one embodiment, a multiple antenna element hybrid satcom antenna 534 may be implemented similarly to the antenna disclosed within U.S. patent application Ser. No. 13/398,643 (the '643 application) by Mitchell. The '643 application discloses a directional antenna system for an aircraft including an enclosure, a linear antenna array disposed within the enclosure and a controller. The linear antenna array may include a plurality of antenna elements physically oriented in the same orientation.

The plurality of antenna elements may be positioned along a longitudinal axis of the aircraft and spaced apart from each other by a predetermined distance center-to-center. The controller may be in communication with each of the plurality of antenna elements of the linear antenna array. The controller may be configured for independently controlling a RF phase angle of each of the plurality of antenna elements based on a position of the aircraft and at least one ground station available to the aircraft, allowing the linear antenna array to concentrate RF radiations in a particular wavelength toward a general direction.

The '643 application further teaches a directional antenna system for an aircraft including an enclosure, a linear antenna array disposed within the enclosure, a tilt mechanism and a controller. The linear antenna array may include a plurality of antenna elements physically oriented in the same orientation with the antenna elements spaced apart from each other by a predetermined distance center-to-center. The tilt mechanism for the linear antenna array may be configured for providing mechanical tilting of the linear antenna array. Furthermore, the controller may be in communication with the tilt mechanism and each of the plurality of antenna elements of the linear antenna array. The controller may be configured for controlling the tilt mechanism and a RF phase angle of each of the plurality of antenna elements, allowing the linear antenna array to concentrate RF radiations in a particular wavelength toward a general direction.

The '643 application further teaches an additional directional antenna system for an aircraft including an enclosure, a first linear antenna array disposed within the enclosure, a second linear antenna array disposed within the enclosure, and a controller. The first linear antenna array may include a plurality of antenna elements physically oriented in a first orientation and spaced apart from each other by a predetermined distance center-to-center; the second linear antenna array may include a plurality of antenna elements physically oriented in a second orientation and spaced apart from each other by the predetermined distance center-to-center.

The controller may be in communication with the each of the plurality of antenna elements of the first linear antenna array and each of the plurality of antenna elements of the second linear antenna array. The controller may be configured for selectively activating at least one of the first linear antenna array or the second linear antenna array. The controller may be further configured for independently controlling a RF phase angle of each of the plurality of antenna elements of the first linear antenna array and each of the plurality of antenna elements of the second linear antenna array, allowing the linear antenna array to concentrate RF radiations in a particular wavelength toward a general direction.

The '643 application teaches a hybrid ESA configuration that has both electrical beam forming capability and a mechanical tilt on a rotatable azimuth table. This hybrid electrical beam/mechanical table design may allow the hybrid satcom antenna 534 to realize reduced gain requirements on each of the flat panel ESAs making it less costly to manufacture while simultaneously improving beam width and gain performance in connectivity with a LEO SAT 160. It also may simultaneously allow for (via volume reduction requirements) positioning an optional second tilted antenna usable for improving hand-off speed (reducing latency) with the next LEO SAT 162 in the constellation 170 with which airborne system 300 may desire connectivity.

This multi-panel ESA hybrid satcom antenna 534 may include two flat array ESA antenna panels volumetrically smaller than other types of antenna elements (e.g., two parabolic dish antennas placed back-to-back). Further, two opposing antenna may increase the amount satellite channels to which the system 300 may have access, statistically increasing an aggregate data rate. Additionally, two or more flat panel ESAs configured in the hybrid satcom antenna 534 may perform an uninterrupted "hot-switch" hand-off from a first LEO SAT to a second LEO SAT. In a stationary ground based installation of system 300, such a hybrid satcom antenna 534 may provide a natural tilt for rain snow roll off and melt as opposed to a horizontal panel limited by ice and snow build up losing transmission and reception capability though moisture accumulation. In addition, the hybrid satcom antenna 534 with a dual ESA panel may employ any polarization or duplex phased array schemes.

In some embodiments, the hybrid satcom antenna 534 may employ a radio system coupled with a modem for each of the panels. The system 300 may combine a data output of each modem via a router function configured to deliver separate or aggregated channels of data to the onboard user(s) with the PED 316. Each of the antenna's RF connections may be each connected to the a transmit and receive modems for sending and receiving demodulated data. The modems inputs/outputs may be connected to a computing system, router and the user network. The router and network may direct data to/from users in the aircraft.

With a design goal of a fuselage antenna of 12" to fit the smallest class of business jets including fuselage diameter sizes as small as 4.5 feet, a serving LEO SAT constellation 170 in orbit at 160-2000 km in altitude may be employed by system 100. Such a high density LEO SAT constellation 170 may be populous enough to provide system 100 a space-to-ground beam pattern requiring the satcom antenna 334 approximately no more than a 45 degree main beam look angle 530 from the zenith 510. This population density of the LEO SAT constellation 170 may provide a selected limit of 3 dB due to 1/cosine aperture loss.

A variety of LEO SAT constellation 170 spacecraft numbers and altitudes fit within this requirement however, a unique requirement of at least 500 satellites is specified herein, to allow sufficient and reasonable relaxation of the satcom antenna look angle 530 requirements and to simultaneously provide sufficient system spot beam density and available bandwidths to the multiple airborne stations 110 in high traffic airspace areas. For example, around Atlanta Hartsfield Jackson International Airport, multiple airborne stations 110 may require connectivity via the satcom link 134. With the population density provided herein, system 100 may offer each of the airborne stations 110 in the Atlanta vicinity some portion of the available connectivity.

Figure 6:
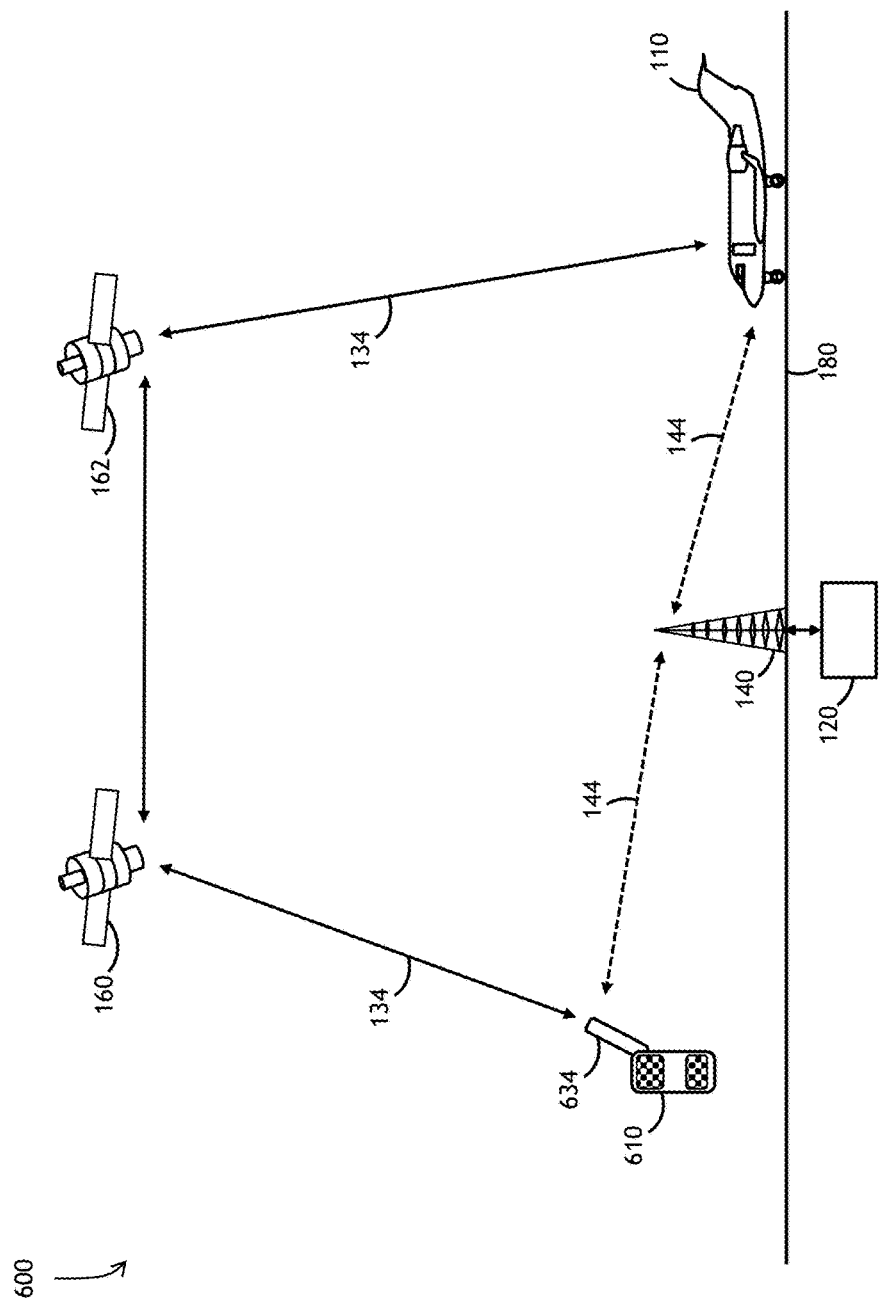
FIG. 6 is a diagram of connectivity available to the airborne station exemplary of one embodiment of the inventive concepts disclosed herein.

Referring to FIG. 6, a diagram of connectivity available to the airborne station exemplary of one embodiment of the inventive concepts disclosed herein is shown. A surface capability 600 of the airborne system 300 may indicate available connectivity for the airborne station 110 while on the surface 180 of the earth. During times when the airborne station 110 is on the ground, the system 300 may receive and establish connectivity with additional types of RF data sources. The system 300 may establish the terrestrial link as the system 300 comes within range of, for example, a WiFi (cellular, WiMax, Aeronautical Mobile Aircraft Communication System (AeroMacs), 3G, 4G, LTE, 5G etc.) ground station. The system 300 may re-negotiate (or use the mobile IP scheme or cellular hand-off discussed above) with a local wireless ground network to continue delivering the terrestrial link 144 to the airborne station 110.

U.S. Pat. No. 6,741,841 (the '841 patent) to Mitchell teaches a similar situation for receiving video data on a mobile platform. The '841 patent teaches a method including receiving first video data transmitted from a first band-type satellite when the mobile platform is in a first zone for playback on the mobile platform, and receiving second video data transmitted from a second band-type satellite receiver circuit when the mobile platform is in a second zone for playback on the mobile platform. The first zone is in an area where the first video data can be received effectively from the first band-type satellite, and the second zone is in an area where the second data can be effectively received from the second band-type satellite.

Each band in the '841 patent may offer a distinct connectivity option within a respective zone, however, the long latency values inherent to the GEO SATs in the '841 patent prove inconsistent with the latency values required for successful video conferencing.

An additional embodiment of the inventive concepts disclosed herein may include a situation where the airborne station 110 is a surface vessel such as a ship, a vehicle such as a semi-truck, an automobile and a tank. In additional implementations, airborne station 110 may include an immobile station such as a remote building on the surface 180 of the earth. Additionally, a personal telephony device such as a satcom phone 610 carried via man pack may offer an antenna 634 capability to connect and maintain connectivity with the terrestrial network 120 via the satcom link 134 as well as the terrestrial link 144. In this manner, airborne system 300 may operate to ensure continuous connectivity between the airborne station 110 and terrestrial network 120.

Figure 7A:
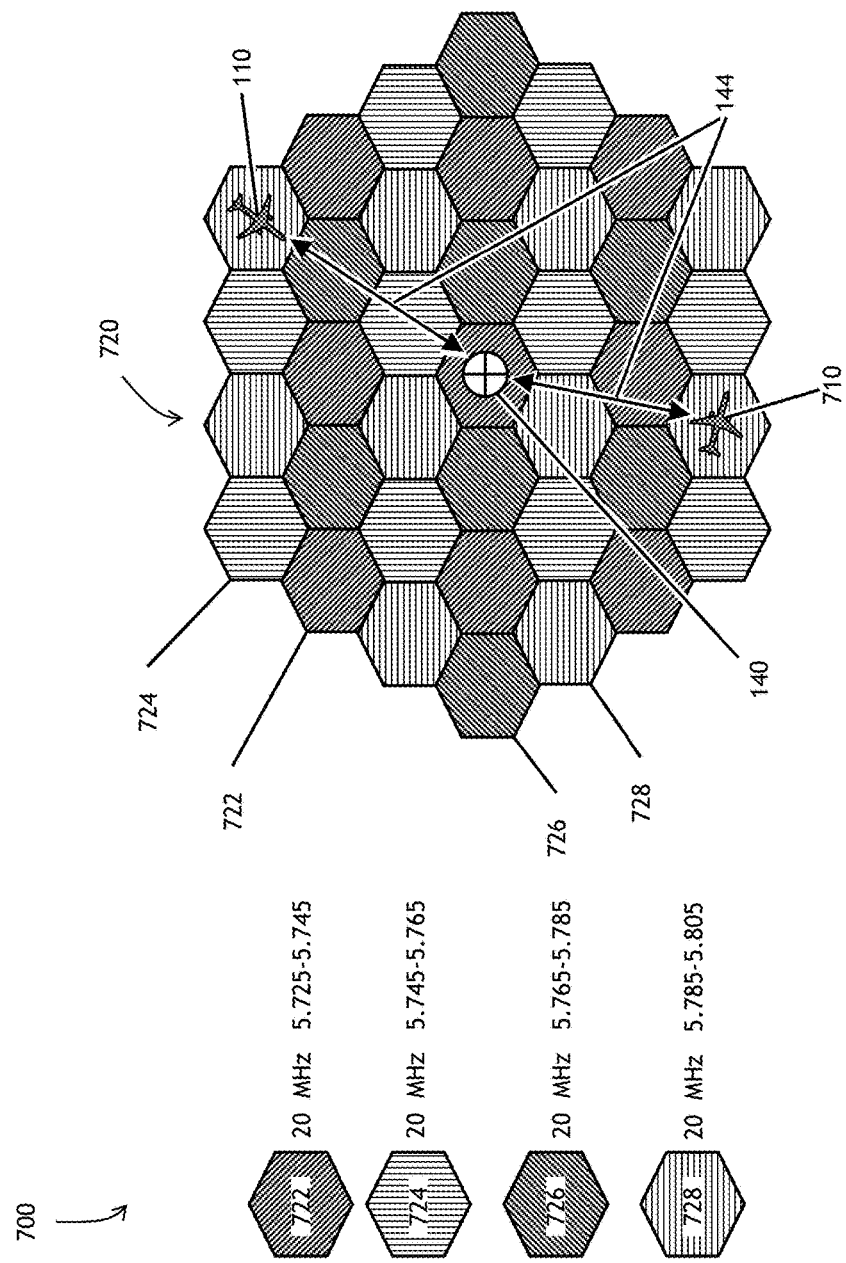
FIGS. 7A and 7B are diagrams of an overhead view of a terrestrial station transmission pattern exemplary of one embodiment of the inventive concepts disclosed herein.
Figure 7B:
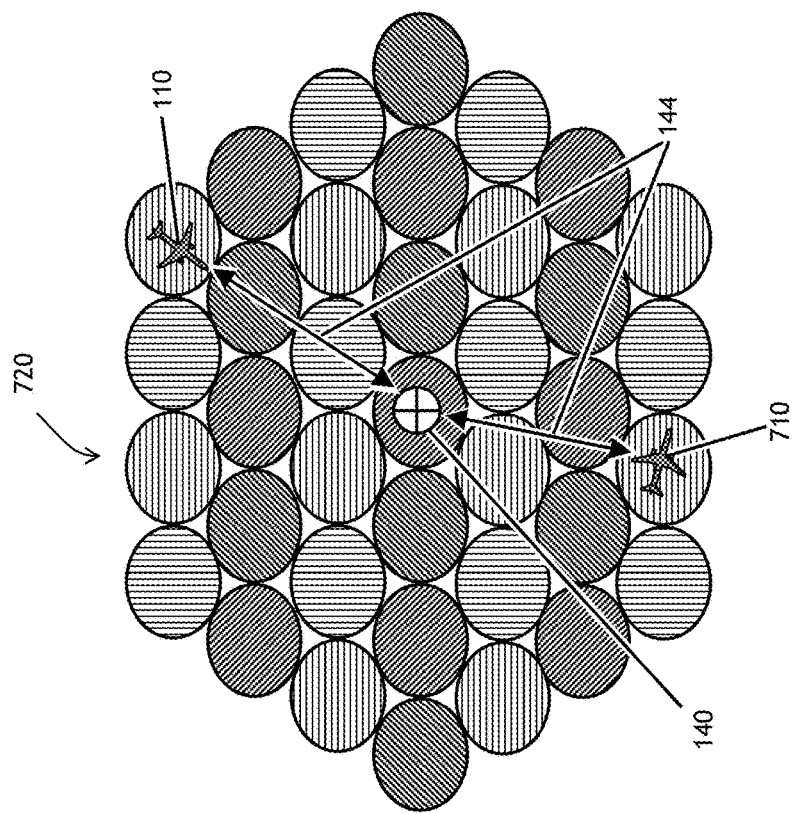
Figure 7B:
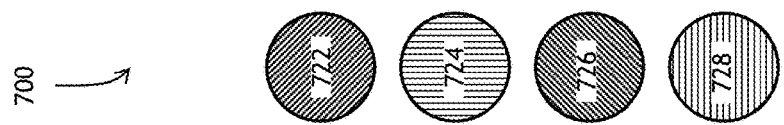

Referring to FIGS. 7A and 7B, diagrams of an overhead view of a terrestrial station transmission pattern exemplary of one embodiment of the inventive concepts disclosed herein is shown. Ground antenna 140 transmission and reception pattern 700 may detail a plurality of cellular geographical transmission areas: a first cellular geographical transmission area 722, a second cellular geographical transmission area 724, a third cellular geographical transmission area 726 and a fourth cellular geographical transmission area 728 oriented in a deconflicted pattern. Each cellular geographical transmission area may have its own frequency deconflicted from each adjacent cellular geographical transmission area. In one embodiment, four deconflicted frequency bands may operate to successfully deconflict the signals from each other within a hexagonal shaped geographical transmission area. While FIG. 7A may detail the cellular geographical transmission areas as hexagonal in shape, FIG. 7A may indicate an alternate circular shape of each of the cellular geographical transmission areas. In further embodiments, the geographical transmission areas may be of any shape to enable efficient terrestrial connectivity via the terrestrial link 144.

For example, a 5 GHz band of spectrum comprising four separate bands may be sufficient for successful deconflicted operation of the airborne system 300 using transmission and reception pattern 700. With the exemplary four bands of spectrum available to ground antenna 140 transmission and reception pattern 700, there is no overlap to cause interference between the adjacent cellular geographical transmission areas.

In some embodiments, the terrestrial link 144 may employ several frequencies to maintain physical frequency deconfliction and spectrum reuse. As the airborne station 110 may use one band of the allocated spectrum, a second airborne station 710 may use the same frequency band of the spectrum for the terrestrial link 144 in a spatially deconflicted cellular pattern 720. Here, for example, the airborne station 110 is using the fourth cellular geographical transmission area 728 at the same time second airborne station 710 is using the fourth cellular geographical transmission area 728 for its terrestrial link 144. Even though the same frequency band is in use, each of the airborne station 110 and the second airborne station 710 is physically separated to deconflict the signals of the terrestrial link 144.

In some embodiments, four frequency bands may be preferred to enable the separation between each of the cellular geographical transmission areas. In one embodiment, a 5 GHz band may be suitable for operation of the terrestrial link 144. For example, frequencies usable by the airborne system 300 of transmission and reception pattern 700 within the 5 GHz band may include:

| Geographical Transmission Area | Frequency Allocation |
| --- | --- |
| First 722 | 5.725-5.745 |
| Second 724 | 5.745-5.765 |
| Third 726 | 5.765-5.785 |
| Fourth 728 | 5.785-5.805 |

Embodiments of the inventive concepts disclosed herein may provide for the terrestrial link 144 within a 5 GHz band from 5.724 GHz to 5.805 GHz broken up into segments of 20 MHz for each cellular geographical transmission area. For example, the first cellular geographical transmission area 722 may be assigned 5.725 to 5.745 GHz for its transmissions and receptions, the second cellular geographical transmission area 724 may be assigned 5.745 to 5.765 GHz for its transmissions and receptions, the third cellular geographical transmission area 726 may be assigned 5.765 to 5.785 GHz for its transmissions and receptions and the fourth cellular geographical transmission area 728 may be assigned 5.725 to 5.745 GHz for its transmissions and receptions.

In one embodiment, an unlicensed frequency band may be of sufficient bandwidth to carry the terrestrial link 144. In an additional embodiment, a band of spectrum formerly used for navigation or broadcast may be suitable for use by the transmission and reception pattern 700. Also, underused or unused bands of spectrum formerly employed for historical purposes such as aeronautical radio navigation. For example, a frequency band within the 4.2 GHz to 4.4 GHz band may possess the necessary bandwidth for the transmission and reception pattern 700 to efficiently deconflict the plurality of cellular geographical transmission areas. An additional embodiment may operate using an unlicensed band of spectrum as follows:

| Cellular geographical transmission area | Frequency Allocation |
|---|---|
| First 722 | 5.240-5.260 |
| Second 724 | 5.260-5.280 |
| Third 726 | 5.280-5.300 |
| Fourth 728 | 5.300-5.320 |

In one example, the airborne station 110 may traverse the transmission and reception pattern 700 through each of the cellular geographical transmission areas along its path. Should the airborne station 110 continue on this path, it will encounter cellular geographical transmission areas 728, 726, 724, 722 over the ground antenna 140, 728 and continuing through the transmission and reception pattern 700. Each of the cellular geographical transmission areas maintaining its own frequency band deconflicted from each adjacent cellular geographical transmission area.

Within a single cellular geographical transmission area 722, the airborne system 300 may operate to connect with a ground tower 140 in a similar manner as described in U.S. Pat. No. 8,831,601 "the '601 patent." The '601 patent teaches a terrestrial communications network suitable for providing air-to-ground connectivity including a plurality of native cellular nodes configured to provide wireless communication connectivity to one or more ground-based wireless communication devices, each native cellular node including a base transceiver station (BTS) having one or more transceivers configured to transmit a downlink signal to the one or more ground-based wireless communication devices at a native downlink frequency and receive an uplink signal from the one or more ground-based wireless communications devices at a native uplink frequency.

The '601 patent continues disclosing a plurality of augmented cellular nodes configured to provide wireless communication connectivity to one or more airborne communications devices, each augmented cellular node including an augmented BTS having one or more transceivers configured to transmit a downlink signal to the one or more airborne communications devices via one or more upwardly directed antennas at the native downlink frequency and receive an air-to-ground uplink signal from the one or more airborne communications devices at a selected air-to-ground uplink frequency, wherein the plurality of native cellular nodes and the plurality of augmented cellular nodes are configured to operate on a common backhaul infrastructure.

Embodiments of the inventive concepts disclosed herein may, through the cellular geographic separation of the frequency spectrum in use, operate to include connectivity to airborne stations 110 and 710 on a plurality of spatially deconflicted frequencies.

Figure 8:
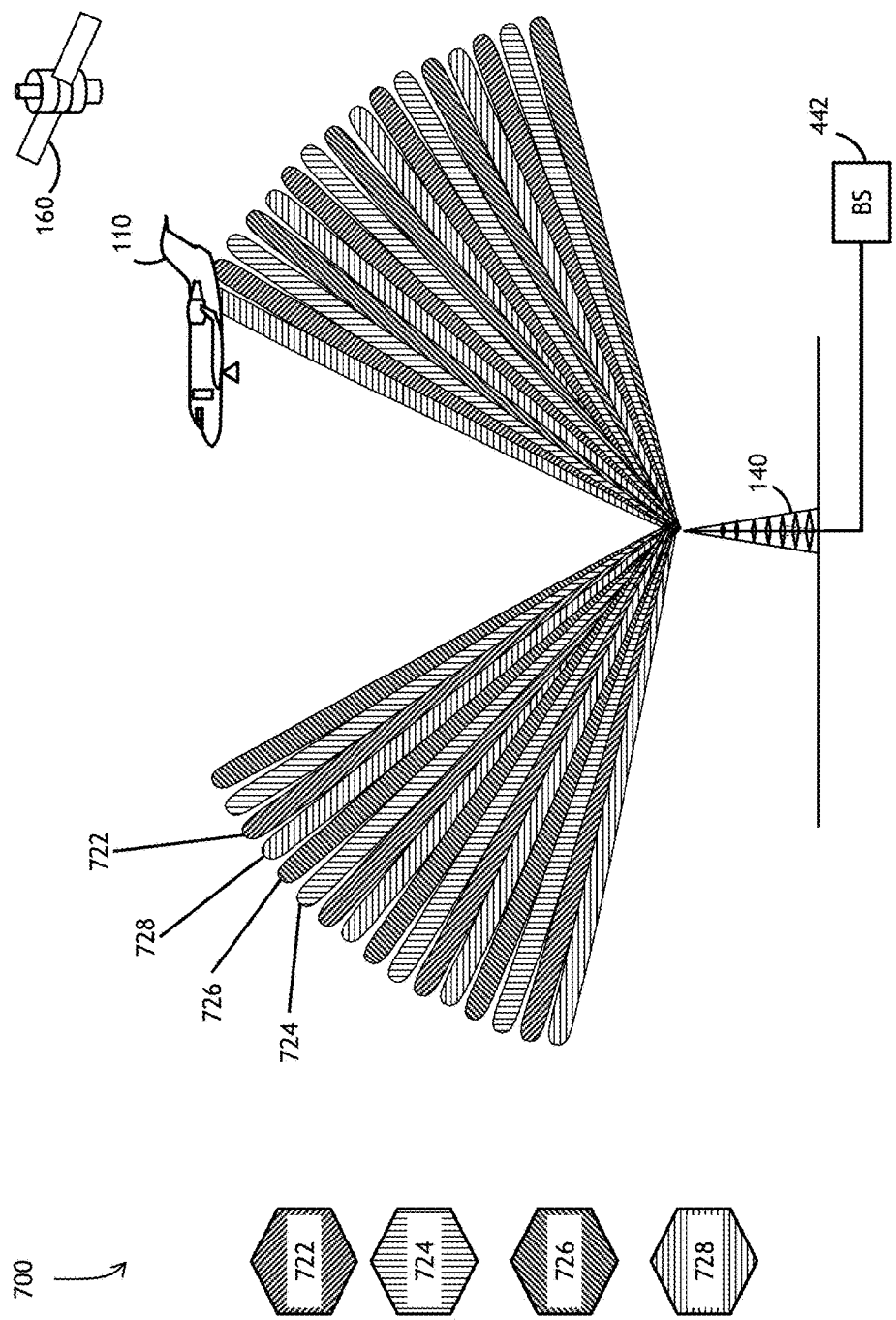
FIG. 8 a diagram of a side view of a ground station transmission pattern exemplary of one embodiment of the inventive concepts disclosed herein.

Referring to FIG. 8, a diagram of a side view of a ground station transmission pattern exemplary of one embodiment of the inventive concepts disclosed herein is shown. Transmission and reception pattern 700 may offer one option for connectivity to a plurality of airborne stations 110 within RF range of the ground antenna 140. The cellular pattern 720 as viewed from the side may be geodesic and hemispherical in shape. In embodiments, each of the geographical transmission areas may be configured as a cellular or as a LTE configured transmission area.

As the airborne station 110 traverses each separate cellular geographical transmission area, the satcom air to ground router 330 may negotiate a connection with the ground antenna 140 via the current frequency band available within the cellular geographical transmission area 722. For example, as airborne station 110 traverses the second cellular geographical transmission area 724 the modem 330 may communicate via the second frequency band used by the second cellular geographical transmission area 724. As the airborne station 110 reaches a border between the second cellular geographical transmission area 724 and the first cellular geographical transmission area 722, the satcom air to ground router 330 may communicate with ground antenna 140 via the first frequency band used by the first cellular geographical transmission area 722.

Each airborne station 110 within RF range of the ground antenna 140 may be able to connect to the base station 442 (and the terrestrial network 120) via one of the frequency bands in use by the cellular geographical transmission area in which the airborne station 110 is physically located. Should two or more airborne stations 110 be traversing the same cellular geographical transmission area (at separate altitudes), each may be required to share the available spectrum within the cellular geographical transmission area.

For example, should a first airborne station 110 be within the first cellular geographical transmission area 722 while a second airborne station 710, at a different altitude, is within the first cellular geographical transmission area 722, each may share the available spectrum (e.g., 10 MHz each of the 20 MHz total) available to all airborne stations within the first cellular geographical transmission area 722. Since airborne stations 110 may move with a high crossing rate relative to each other, a time where more than one airborne station may be required to share the spectrum available within a single cellular geographical transmission area 722 may be relatively short.

Figure 9:
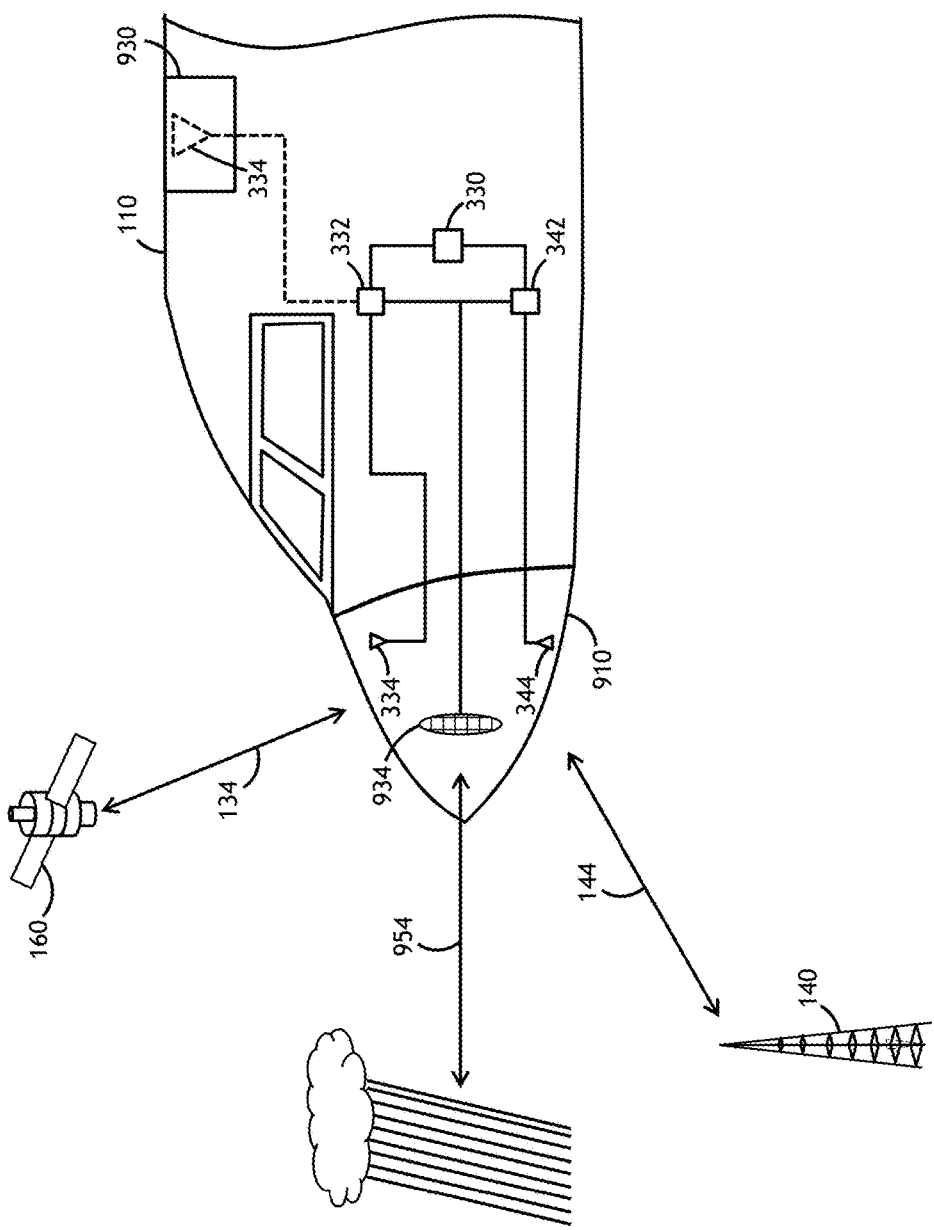
FIG. 9 is a diagram of a system for broadband communication sited in an existing radome of an aircraft exemplary of one embodiment of the inventive concepts disclosed herein.

Referring to FIG. 9, a diagram of a system for broadband communication sited in an existing radome of an aircraft exemplary of one embodiment of the inventive concepts disclosed herein is shown. As certification processes for regulatory approval of an additional structure external to the airborne station 110 may be expensive, embodiments of the inventive concepts disclosed herein may strive to site the airborne system 300 antenna element within the structure of the airborne station 110. Disposing the satcom antenna 334 and the terrestrial antenna 344 within a nose radome 910 of the airborne station 110 may allow antenna placement without the additional cost of regulatory approval.

The EIRP of each LEO SAT 160 within LEO constellation 170 may allow airborne system 300 to reduce the size of satcom antenna 334 for placement within an existing cavity within the nose radome 910 of an aircraft. In some aircraft, the nose radome 910 may be manufactured from material invisible to a specific frequency of RF signal transmission. For example, some aircraft may be fitted with a nose radome invisible to a weather radar frequency of approximately 5 GHz for successful transmission and reception of a weather radar signal 954. Embodiments of the inventive concepts disclosed herein may provide for a configuration of the nose radome 910 for invisibility to the desired frequencies used by airborne system 300 without modification of the external shape of the nose radome.

In embodiments, airborne system 300 may mount one or both of the satcom antenna 334 and the terrestrial antenna 344 within the existing nose radome 910 of airborne station 110. In some aircraft, an existing nose radome may already be transparent to the frequencies airborne system 300 may use. For example, an onboard weather radar may operate on a narrow frequency band within a frequency range of 5-12 GHz usable for weather radiolocation. Should airborne system 300 be configured with satcom antenna 334 and the terrestrial antenna 344 within the nose radome 910 of an aircraft with the onboard weather radar, no or very little modification would be required to the external nose radome 910 of the airborne station 110 for successful airborne system 300 operation.

In some embodiments, each of satcom antenna 334 and terrestrial antenna 344 may be ESA elements configured for directional transmission and reception of a RF signal. Further, one or more the satcom antenna 334 and terrestrial antenna 344 may also operate on a time sharing basis and or a frequency deconfliction basis with a weather radar antenna element onboard the airborne station 110. For example, while satcom antenna 334 is in use by airborne system 300 for low latency connectivity, the terrestrial antenna 344 may act as the antenna element for use by a weather radar system onboard the airborne station 110 and vice versa. In this manner, less total weight may be realized for additional fuel and cost savings for the aircraft operator.

In further embodiments, a single antenna element (e.g., a single ESA panel) 934 may operate to perform the function of the three operations described herein: the satcom link 134, the terrestrial link 144, and the weather radar function. Each function may possess a separate frequency and a separate and distinct protocol for the RF signals transmitted and received by the single antenna element 934. For example, a single ESA panel may possess elements for a 5 GHz transmission and reception for the satcom link 134, elements for a GSM transmission and reception for the terrestrial link 144 and elements for an 8.5 GHz transmission and reception of the weather radar signals 954.

In a similar connectivity environment, the incorporated '853 patent teaches an antenna stack configured around the weather radar antenna within a nose radome 910 for connectivity with a terrestrial network. Embodiments of the inventive concepts disclosed herein may use similar elements to connect with a ground antenna 140.

Additionally, embodiments of the inventive concepts disclosed herein may transmit and receive signals through a RF transparent patch 930 in the external skin of the airborne station 110. For example, should satcom antenna 334 be sited forward of the tail of an aircraft, a manufacturer may remove a portion of aircraft skin and replace the removed portion with a substance transparent to the frequencies desired by the satcom link 134 and or the terrestrial link 144. Although transparent to the frequencies, the transparent patch 930 may be structurally similar to the removed portion. In this manner, no change to the airflow around the removed portion would be realized by the aircraft and an operator may experience no increase in drag as a result of the installation of the transparent patch 930.

Figure 10:
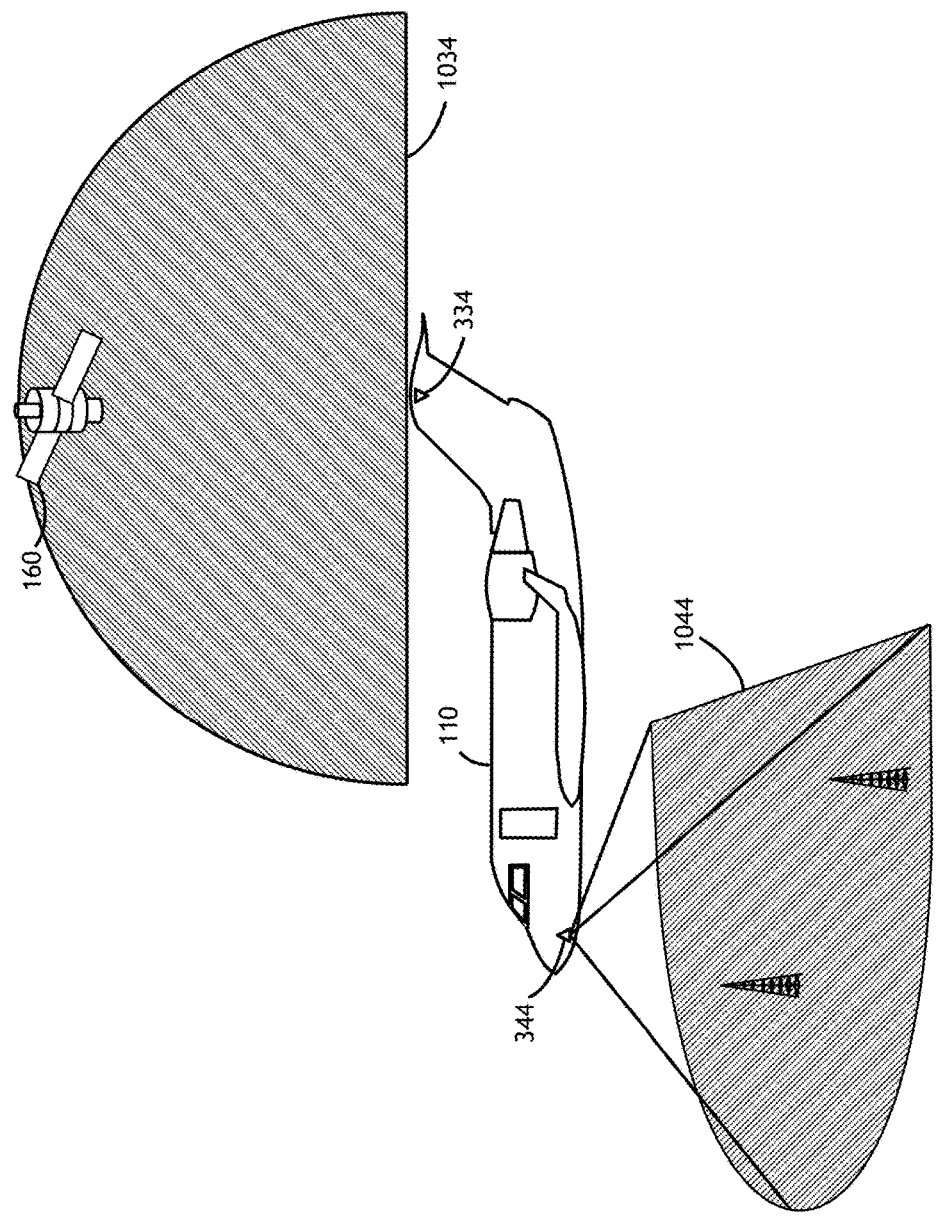
FIG. 10 is a diagram of possible antenna coverage exemplary of one embodiment of the inventive concepts disclosed herein.

Referring to FIG. 10, a diagram of possible antenna coverage exemplary of one embodiment of the inventive concepts disclosed herein is shown. Coverage areas may indicate areas in which the antenna elements onboard airborne station 110 may send and receive signals. Preferably, one embodiment of the airborne system 300 configuration may include the terrestrial antenna 344 sited within in the nose radome 910 of the airborne station 110 and operating within a frequency range (e.g., approximately 5 GHz) transparent to the existing nose radome 910 while the satcom antenna 334 is sited within an upper area of the vertical tail of airborne station 110. In this manner, the satcom antenna 334 may have a 180 degree area of coverage 1034 in both a longitudinal and a lateral axis while the terrestrial antenna 144 may have the same 180 degree coverage 1044 in the lateral but be slightly limited in coverage 1044 along the longitudinal axis of the airborne station 110 due to aircraft structure.

Figure 11:
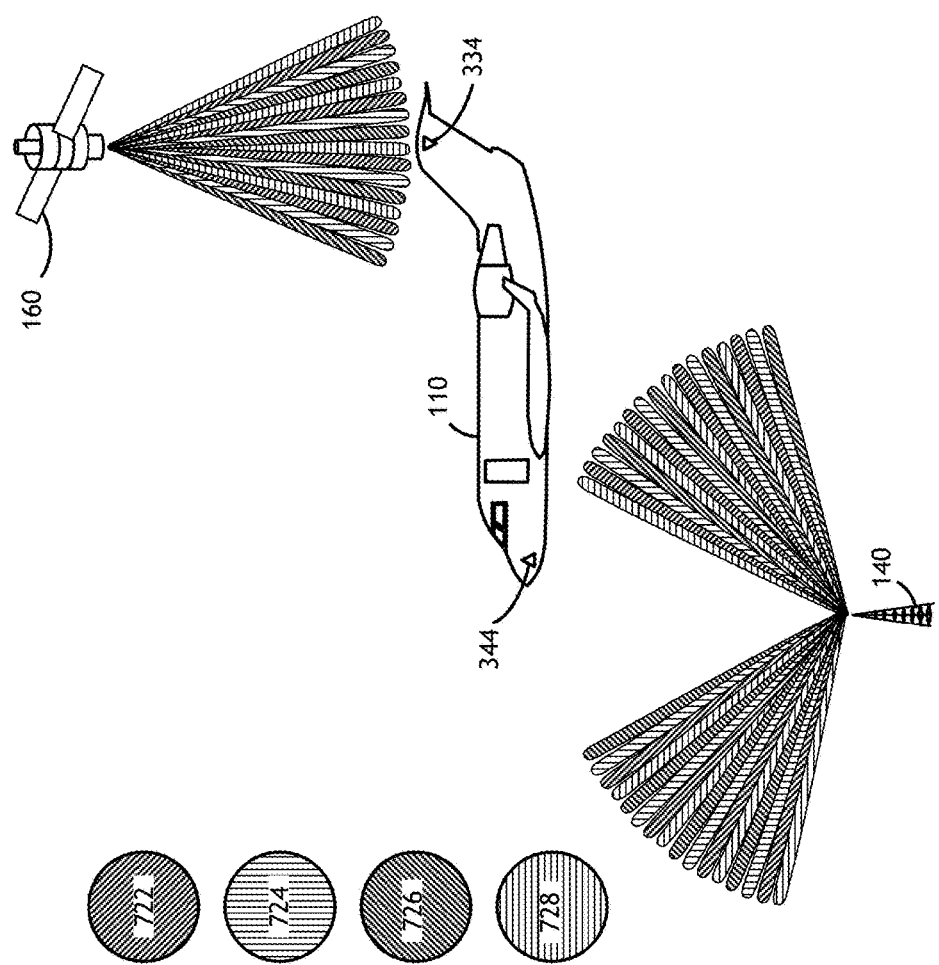
FIG. 11 is a diagram of a transmission and reception pattern for the ground antenna and the LEO SAT exemplary of one embodiment of the inventive concepts disclosed herein.

Referring to FIG. 11, a diagram of a transmission and reception pattern for the ground antenna and the LEO SAT exemplary of one embodiment of the inventive concepts disclosed herein is shown. In embodiments, system 100 may offer a transmission and reception pattern for each of the LEO SAT 160 as well as the ground antenna 140. In this embodiment, each of the satcom antenna 334 and the terrestrial antenna 344 may be configured to track its respective link via the cellular geographical transmission areas 722-728. In the case of the LEO SAT cellular geographical transmission area, the relative motion of the LEO SAT versus the airborne station 110 may cause a more rapid transition from a first cellular geographical transmission area 722 to a second cellular geographical transmission area 724.

Figure 12:
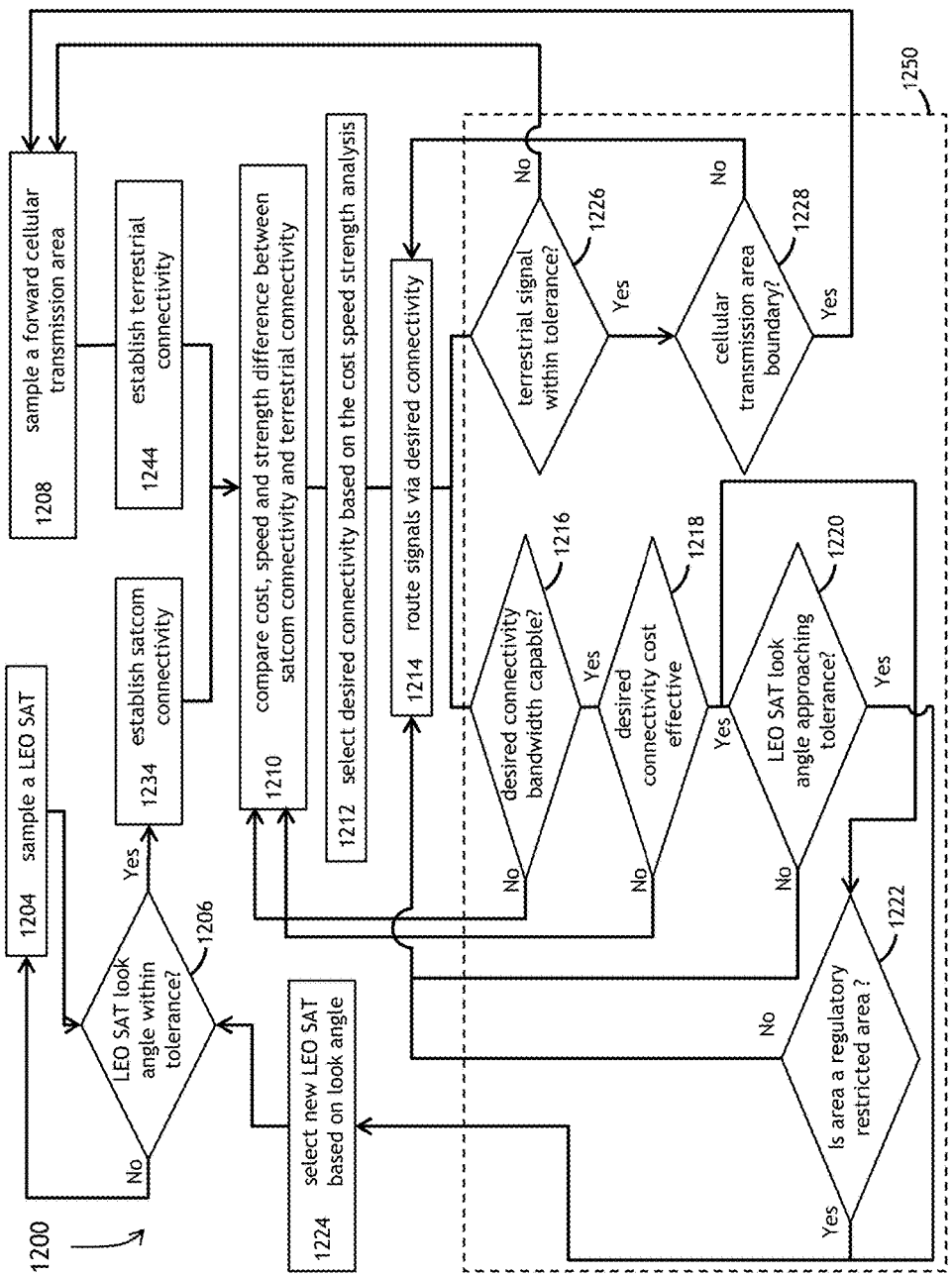
FIG. 12 is a flowchart for a method for broadband communication from an airborne station exemplary of one embodiment of the inventive concepts disclosed herein.

Referring to FIG. 12, a flowchart for a method for broadband communication from an airborne station exemplary of one embodiment of the inventive concepts disclosed herein is shown. The method 1200 may, at a step 1204, sample a LEO SAT to determine if the sampled LEO SAT is capable of maintaining a desired satcom connectivity. At a step 1206 the method may query if the sampled LEO SAT relative position is within a tolerance for the look angle from the airborne station zenith. If the answer is yes, the method may, at a step 1234, establish satcom connectivity with the sampled LEO SAT. Should the answer to query 1206 be no, the method may proceed to the step 1204 to sample a different LEO SAT for the desired satcom connectivity.

The sampling may be carried out onboard the airborne station 110 and determine a desirable LEO SAT with which the system 300 should establish connectivity. The sampling may include for example, a query of each of the LEO SATs within RF range of the airborne station. Such a sampling may also include as inputs: the position and altitude of the airborne station 110, known positions and trajectories (from a memory) of each of the LEO SATs in the high density LEO SAT constellation 170 and a signal reception analysis of LEO SAT signal transmission strength and airborne station receive (look) angle coupled with the known trajectories. For example, a LEO SAT decreasing in range may be preferable over a LEO SAT increasing in range.

The method 1200 may continue, at a step 1208 with sampling a forward cellular transmission area for suitability for the terrestrial connectivity. Should the sampling reveal an adequate signal, the method 1200 may, at a step 1244, establish the terrestrial connectivity with the ground antenna via the frequency band in use by the cellular geographical transmission area. Once each of the satcom connectivity and the terrestrial connectivity are established, the method 1200 may, at a step 1210, compare a cost, a speed and a strength difference between the satcom connectivity and the terrestrial connectivity.

Once the method 1200 compares each of the satcom and terrestrial connectivity, it may, at a step 1212, select a desired connectivity based on the cost speed strength analysis. The method 1200 may continue, at a step 1214, to route signals between the airborne station and the terrestrial network via the desired connectivity until a desired connectivity monitor 1250 may determine a more desirable connectivity option may be available.

One monitor may, at a query 1216, continuously monitor the bandwidth capabilities of the desired connectivity. Should the query 1214 result be yes, the method may continue to route signals via the desired connectivity. Should the query 1216 be no, the method 1200 may return to the step 1210 to make a new comparison. An additional query 1218 may continuously monitor a cost of the desired connectivity and determine if the cost of the desired connectivity is within a user defined condition. Should the query 1218 result in the positive, the method may continue to route signals via the desired connectivity. However, if the query 1218 results in the negative, the method 1200 may also return to the comparison step 1210.

A next query 1220, may continuously monitor the look angle between the zenith of the airborne station and the LEO SAT delivering the satcom connectivity. Even though the airborne station may be using the terrestrial connectivity for its desired connectivity, method 1200 may continuously monitor the look angle for a more desirable LEO SAT. Should the query 1220 result in the current LEO SAT approaching a look angle tolerance, the method 1200 may proceed to a next query 1222 to determine if the area over which airborne station 110 is operating is within a regulatory restricted area. If the answer to query 1222 be yes, the method 1200 may at a step 1224, select a new LEO SAT based on a more preferable set of connectivity parameters. Should the query 1222 result in the negative, the method may continue to route signal via the desired connectivity 1214.

In parallel to the above analysis, the connectivity monitor 1250 may also continuously monitor the terrestrial connectivity. A first query 1226 may monitor the signal strength of the terrestrial connectivity. Should the result be positive, the method 1200 may continue with the terrestrial connectivity in use and proceed to the next step. Should the query 1224 result in the negative, the method 1200 may return to the step 1208 to sample a cellular transmission area forward of airborne station 110.

At a second query 1226 the method 1200 may continuously monitor the cellular transmission area in use for the terrestrial connectivity. Should the query result in the negative, the airborne station may still be squarely within the cellular transmission area and method 1200 may continue the terrestrial connectivity with the presently selected cellular transmission area. However, should the query 1226 result in the positive, the airborne station may be nearing a boundary between a first cellular transmission area and a second cellular transmission area. Then, the method 1200 may return to step 1208 for a new forward sample.

System 300 selection of a new LEO SAT 160 may differ from the system 300 sample and selection 1208 of a forward ground antenna 140. In embodiments, system 300 may determine a LEO SAT actually behind the airborne station 110 may be the preferable choice for the satcom connectivity. Based on the relative speed of LEO SATs, a preferable LEO SAT may be on a similar track as the airborne station 110 and an overtaking LEO SAT may allow for the longest satcom connectivity.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for airborne broadband, comprising:
    a first station configured for a broadband radio frequency (RF) satcom connectivity and a broadband RF terrestrial connectivity with a terrestrial network;
    a satcom electronically steerable array (ESA) antenna element onboard the first station configured for the broadband RF satcom connectivity with at least one low earth orbit satellite vehicle (LEO SAT) of a high density LEO SAT constellation, the satcom ESA antenna element limited in size for placement within an aircraft structure, the satcom ESA antenna element further configured for a programmable limited look angle from a zenith relative to the first station, the satcom ESA antenna element further configured for high line of sight tracking of the at least one LEO SAT, the high line of sight tracking including:
        establishing and maintaining the broadband RF satcom connectivity with a first LEO SAT of the at least one LEO SAT;
        determining an imminent loss of the broadband RF satcom connectivity with the first LEO SAT, the imminent loss of broadband RF satcom connectivity based on one of: a received signal power level from the first LEO SAT and a current look angle to the first LEO SAT from the zenith;
establishing an initial connectivity with a second LEO SAT of the at least one LEO SAT; and
transitioning the broadband RF satcom connectivity from the first LEO SAT to the second LEO SAT;
a terrestrial antenna element onboard the first station configured for the broadband RF terrestrial connectivity with at least one ground station associated with the terrestrial network; and
a controller onboard the first station, the controller in data communication with the satcom ESA antenna element and the terrestrial antenna element, the controller configured for:
determining a desired RF connectivity between the broadband RF satcom connectivity and the broadband RF terrestrial connectivity, the determining based on a user condition, the user condition including a bandwidth comparison, speed comparison, and cost comparison;
establishing a data connectivity between the first station and at least one of the broadband RF satcom connectivity and the terrestrial network connectivity via the desired RF connectivity; and
directing a content of the data connectivity to at least one recipient onboard the first station.

2. The system for airborne broadband of claim 1, wherein the at least one ground station provides at least one upward directed RF beam, the at least one upward directed RF beam comprising a pattern of cellular geographical transmission areas, each cellular geographical transmission area 1) bounded by an azimuth and an elevation from the at least one ground station, 2) limited to transmission and reception on a frequency band, and 3) frequency deconflicted from an adjacent cellular geographical transmission area; the frequency band one of two or more frequency bands available to the at least one ground station; the terrestrial antenna element further configured for tracking the at least one ground station, the tracking including:
establishing the broadband RF terrestrial connectivity with a first ground station via a first cellular geographical transmission area provided by the first ground station, the first cellular geographical transmission area limited to a first frequency band of the two or more frequency bands;
maintaining the broadband RF terrestrial connectivity within the first cellular geographical transmission area via the first frequency band;
determining a current azimuth and elevation from the first ground station to the terrestrial antenna element;
determining an imminent loss of the broadband RF terrestrial connectivity within the first cellular geographical transmission area, the imminent loss of the broadband RF terrestrial connectivity based on the current azimuth and elevation;
establishing an initial broadband RF terrestrial connectivity with a second cellular geographical transmission area provided by one of: the first ground station and a second ground station, the second cellular geographical transmission area limited to a second frequency band of the two or more frequency bands; and
transitioning the broadband RF terrestrial connectivity from the first cellular geographical transmission area to the second cellular geographical transmission area.

3. The system for airborne broadband of claim 1, wherein the terrestrial connectivity is established via one of: a Long-Term Evolution (LTE) wireless data communication standard, a standard using a Frequency Division Duplex (FDD) communications and a standard using a Time Division Duplex (TDD) communications.

4. The system for airborne broadband of claim 1, wherein the broadband RF satcom connectivity is established directly from the airborne station through a single LEO SAT of the high density LEO SAT constellation to the terrestrial network.

5. The system for airborne broadband of claim 1, wherein the first station executes a single enabling action to establish one of the broadband satcom connectivity and the terrestrial connectivity, the single enabling action available instantaneously from a maintenance standby mode.

6. The system for airborne broadband of claim 1, wherein the user condition is further based upon a regulatory connectivity comparison and a range comparison between the broadband RF satcom connectivity and the broadband RF terrestrial connectivity.

7. The system for airborne broadband of claim 1, wherein the satcom ESA antenna element further comprises one of: a flat panel ESA antenna, a curved panel ESA antenna and a set of independent mechanically tilted ESA antenna elements horizontally rotatable about a vertical axis of the first station.

8. The system for airborne broadband of claim 1, wherein each of the satcom ESA antenna element and the terrestrial antenna element are one of: multiple antenna elements disposed within a nose radome of an aircraft, dual antenna elements disposed within the nose radome of the aircraft, and a single antenna element including multiple elements disposed within the nose radome of the aircraft.

9. The system for airborne broadband of claim 8, wherein the single antenna element including multiple elements disposed within the nose radome of the aircraft is further configured as a multi-role antenna element configured for: 1) the broadband RF satcom connectivity, 2) the broadband RF terrestrial connectivity, and 3) transmission and reception of a weather radar signal.

10. The system for airborne broadband of claim 1, further including a latency value associated with each of the broadband RF satcom connectivity and the broadband RF terrestrial connectivity is one of: less than one hundred milliseconds, a range from zero to two-hundred milliseconds, and less than fifty milliseconds.

11. The system for airborne broadband of claim 1, wherein the satcom ESA antenna element is limited in size to less than one foot in diameter for placement within the aircraft structure.

12. The system for airborne broadband of claim 1, wherein at least one of the broadband RF terrestrial connectivity and the broadband RF satcom connectivity operates within one of: 1) a frequency range from 5.725 GHz to 5.805 GHz, 2) a frequency range of 12 to 18 GHz inclusive of the Ku band, 3) a frequency range from an unlicensed band, including one of an unlicensed 2.4 GHz band and an unlicensed 5 GHz band, and 4) a frequency range reallocated from a purpose other than communication.

13. The system for airborne broadband of claim 1, wherein at least one of the satcom ESA antenna element and the terrestrial antenna element is configured for mounting within an unmodified nose radome of an aircraft.

14. The system for airborne broadband of claim 1, wherein the controller is further configured for maintaining connectivity with the terrestrial network via at least one of a cellular base station transfer protocol, a mobile internet protocol, and a combination of the cellular base station transfer and mobile internet protocols.

15. The system for airborne broadband of claim 1, further including a software defined radio configured for establishing the broadband RF terrestrial connectivity with the terrestrial network, the software defined radio configured for adapting to a plurality of protocols from each of a plurality of the at least one ground station.

16. A method for airborne broadband, comprising:
    establishing a radio frequency (RF) satcom connectivity between a first station and a terrestrial network, the first station configured for broadband RF satcom connectivity via a satcom electronically steerable array (ESA) antenna element onboard the first station configured for the broadband RF satcom connectivity with at least one low earth orbit satellite vehicle (LEO SAT) of a high density LEO SAT constellation, the satcom ESA antenna element limited in size for placement within an aircraft structure; the satcom ESA antenna element further configured for a programmable limited look angle from a zenith relative to the first station;
    establishing and maintaining the broadband RF satcom connectivity via a first LEO SAT of the at least one LEO SAT via a high line of sight tracking of the at least one LEO SAT, the high line of sight tracking including:
        determining an imminent loss of the broadband RF satcom connectivity with the first LEO SAT, the imminent loss of broadband RF satcom connectivity based on one of: a received signal power level from the first LEO SAT and a current look angle to the first LEO SAT from the zenith;
        establishing an initial connectivity with a second LEO SAT of the at least one LEO SAT; and
        transitioning the broadband RF satcom connectivity from the first LEO SAT to the second LEO SAT;
    establishing a broadband RF terrestrial connectivity between the first station and the terrestrial network, the broadband RF terrestrial connectivity via a terrestrial antenna element onboard the first station configured for the broadband RF terrestrial connectivity with at least one ground station associated with the terrestrial network hexagonal;
    determining a desired RF connectivity between the broadband RF satcom connectivity and the broadband RF terrestrial connectivity, the determining based on a user condition, the user condition including a bandwidth comparison, speed comparison, and cost comparison, the determining via a controller onboard the first station in data communication with the satcom ESA antenna element and the terrestrial antenna element;
    establishing a data connectivity between the first station and at least one of the broadband RF satcom connectivity and the terrestrial network connectivity via the desired RF connectivity; and
    directing, via the controller, a content of the data connectivity to at least one recipient onboard the first station.

17. The method for airborne broadband of claim 16, wherein the at least one ground station provides at least one upward directed RF beam, the at least one upward directed RF beam comprising a pattern of cellular geographical transmission areas, each cellular geographical transmission area 1) bounded by an azimuth and an elevation from the at least one ground station, 2) limited to transmission and reception on a frequency band and 3) frequency deconflicted from an adjacent cellular geographical transmission area; the frequency band one of two or more frequency bands available to the at least one ground station; the terrestrial antenna element further configured for tracking the at least one ground station, the tracking including:
    establishing the broadband RF terrestrial connectivity between the first station and a first ground station via a first cellular geographical transmission area provided by the first ground station, the first cellular geographical transmission area limited to a first frequency band of the two or more frequency bands;
    maintaining the broadband RF terrestrial connectivity within the first cellular geographical transmission area via the first frequency band;
    determining a current azimuth and elevation from the first ground station to the terrestrial antenna element;
    determining an imminent loss of the broadband RF terrestrial connectivity within the first cellular geographical transmission area, the imminent loss of the broadband RF terrestrial connectivity based on the current azimuth and elevation;
    establishing initial broadband RF terrestrial connectivity with a second cellular geographical transmission area provided by the first ground station, the second cellular geographical transmission area limited to a second frequency band of the two or more frequency bands; and
    transitioning the broadband RF terrestrial connectivity from the first cellular geographical transmission area to the second cellular geographical transmission area.

18. The method for airborne broadband of claim 16, wherein the terrestrial connectivity is established via one of: a Long-Term Evolution wireless data communication standard, a standard using a Frequency Division Duplex communications and a standard using a Time Division Duplex communications.

19. The method for airborne broadband of claim 16, wherein the user condition is further based upon a regulatory connectivity comparison and a range comparison between the broadband RF satcom connectivity and the broadband RF terrestrial connectivity.

20. The method for airborne broadband of claim 16, wherein the satcom ESA antenna element further comprises one of: a flat panel Electronically Scanned Array (ESA) antenna, a curved panel ESA antenna and a set of independent mechanically tilted ESA antenna elements horizontally rotatable about a vertical axis of the first station.

21. The method for airborne broadband of claim 16, wherein each of the satcom ESA antenna element and the terrestrial antenna element are one of: multiple antenna elements disposed within a nose radome of an aircraft, dual antenna elements disposed within the nose radome of the aircraft, and a single antenna element including multiple elements disposed within the nose radome of the aircraft, and wherein each of the satcom ESA antenna and the terrestrial antenna is configured for mounting within an unmodified nose radome of an aircraft.

22. The method for airborne broadband of claim 21, wherein the single antenna element including multiple elements disposed within the nose radome of the aircraft is further configured as a multi-role antenna element configured for: 1) the broadband RF satcom connectivity, 2) the broadband RF terrestrial connectivity and 3) transmission and reception of weather radar signals.

23. The method for airborne broadband of claim 16, further including a latency value associated with each of the satcom connectivity and the terrestrial connectivity is one of: less than one hundred milliseconds, a range from zero to two-hundred milliseconds and less than fifty milliseconds.

24. The method for airborne broadband of claim 16, wherein the satcom ESA antenna element is limited in size to less than one foot in diameter for placement within the aircraft structure.

25. The method for airborne broadband of claim 16, wherein at least one of the terrestrial connectivity and the satcom connectivity operates within one of: 1) a frequency range from 5.725 GHz to 5.805 GHz, 2) a frequency range of 12 to 18 GHz inclusive of the Ku band, 3) a frequency range from an unlicensed band including one of an unlicensed 2.4 GHz band and an unlicensed 5 GHz band, and 4) a frequency range reallocated from a purpose other than communication, and 5) a frequency band associated with one of VHF, UHF, L, S, F, C, X, K, Q, U, V, E W, F, D, THz and optical bands.

26. The method for airborne broadband of claim 16, wherein maintaining the broadband RF terrestrial connectivity further includes the controller maintaining connectivity with the terrestrial network via at least one of a cellular base station transfer protocol, a mobile internet protocol and a combination of the cellular base station transfer and mobile internet protocols.

27. The method for airborne broadband of claim 16, wherein establishing the broadband RF terrestrial connectivity further includes a software defined radio onboard the first station configured for establishing the broadband RF terrestrial connectivity with the terrestrial network, the software defined radio configured for adapting to a plurality of protocols from each of a plurality of terrestrial networks.

\* \* \* \* \*